United States Patent
Wang et al.

(10) Patent No.: US 12,120,614 B2
(45) Date of Patent: Oct. 15, 2024

(54) BEAM BASED POWER CONTROL FOR SIDELINK

(71) Applicant: QUALCOMM Incorporated, San Diego, CA (US)

(72) Inventors: Hua Wang, Basking Ridge, NJ (US); Sony Akkarakaran, Poway, CA (US); Tao Luo, San Diego, CA (US); Junyi Li, Fairless Hills, PA (US); Yan Zhou, San Diego, CA (US); Hong Cheng, Basking Ridge, NJ (US); Jelena Damnjanovic, Del Mar, CA (US); Peter Gaal, San Diego, CA (US); Jung Ho Ryu, Fort Lee, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 289 days.

(21) Appl. No.: 17/457,883

(22) Filed: Dec. 6, 2021

(65) Prior Publication Data

US 2023/0180132 A1    Jun. 8, 2023

(51) Int. Cl.
*H04W 52/14* (2009.01)
*H04W 16/28* (2009.01)
(Continued)

(52) U.S. Cl.
CPC .......... *H04W 52/14* (2013.01); *H04W 16/28* (2013.01); *H04W 52/0245* (2013.01);
(Continued)

(58) Field of Classification Search
CPC . H04W 52/14; H04W 16/28; H04W 52/0245; H04W 52/242; H04W 52/42; H04W 76/14; H04W 52/383
See application file for complete search history.

(56) References Cited

U.S. PATENT DOCUMENTS

| | | | |
|---|---|---|---|
| 11,570,726 B2* | 1/2023 | Wu | H04W 52/242 |
| 11,595,918 B2* | 2/2023 | Li | H04W 52/383 |

(Continued)

FOREIGN PATENT DOCUMENTS

| | | | | |
|---|---|---|---|---|
| WO | 2020033088 A1 | 2/2020 | | |
| WO | WO-2020126114 A1 * | 6/2020 | ........... | H04B 7/0617 |

OTHER PUBLICATIONS

"A Tutorial on 5G NR V2X", Garcia et al, IEEE, 3rd Quarter 2021 (Year: 2021).*

(Continued)

*Primary Examiner* — Habte Mered
(74) *Attorney, Agent, or Firm* — QUALCOMM Incorporated

(57) ABSTRACT

Method and apparatus to determine a sidelink beam and associated power control parameter for sidelink communication. The apparatus initiates a beam pairing with a second UE, the first UE being a transmitting UE and the second UE being a receiving UE. The apparatus identifies a sidelink beam from a plurality of sidelink beams and at least one power control parameter for sidelink communication with the second UE. Different sidelink beams use different power control parameters. The apparatus communicates with the second UE via a selected sidelink beam and the at least one power control parameter.

30 Claims, 15 Drawing Sheets

(51) Int. Cl.
  *H04W 52/02* (2009.01)
  *H04W 52/24* (2009.01)
  *H04W 52/42* (2009.01)
  *H04W 76/14* (2018.01)

(52) U.S. Cl.
  CPC ......... *H04W 52/242* (2013.01); *H04W 52/42* (2013.01); *H04W 76/14* (2018.02)

(56) References Cited

U.S. PATENT DOCUMENTS

| | | | |
|---|---|---|---|
| 2021/0051594 A1* | 2/2021 | Chae | H04W 76/27 |
| 2021/0100059 A1* | 4/2021 | Xu | H04B 7/06954 |
| 2021/0127365 A1* | 4/2021 | Wang | H04W 72/542 |
| 2022/0159583 A1* | 5/2022 | Wang | H04L 5/0051 |
| 2022/0183017 A1* | 6/2022 | Wu | H04B 17/309 |
| 2022/0225283 A1* | 7/2022 | Ye | H04W 72/51 |
| 2022/0286184 A1* | 9/2022 | Li | H04L 5/0051 |
| 2022/0330038 A1* | 10/2022 | Ganesan | H04W 52/10 |
| 2022/0394697 A1* | 12/2022 | Kim | H04W 72/54 |
| 2022/0417867 A1* | 12/2022 | Yoshioka | H04W 72/1263 |
| 2023/0361955 A1* | 11/2023 | Ganesan | H04B 7/06966 |

OTHER PUBLICATIONS

International Search Report and Written Opinion—PCT/US2022/051302—ISA/EPO—Apr. 5, 2023.

Qualcomm Incorporated: "Enhancements on Multi-Beam Operation", 3GPP Draft, 3GPP TSG RAN WG1 Meeting #107-e, R1-2112196, 3rd Generation Partnership Project, Mobile Competence Centre, 650, Route Des Lucioles, F-06921 Sophia-Antipolis Cedex, France, vol. RAN WG1, No. Nov. 11, 2021-Nov. 19, 202, 10 Pages, Nov. 6, 2021, XP052075302, section 1.

Samsung: "On Physical Layer Procedures for NR V2X", 3GPP Draft, R1-1902274, 3GPP TSG RAN WG1 #96, 3rd Generation Partnership Project (3GPP), Mobile Competence Centre, 650, Route Des Lucioles, F-06921 Sophia- Antipolis Cedex, France, vol. RAN WG1, No. Athens, Greece, Feb. 25, 2019-Mar. 1, 2019, Feb. 15, 2019, XP051599969, 13 Pages, Paragraph 2 Figure 1, sections 4 and 5.

* cited by examiner

BEAM BASED POWER CONTROL FOR SIDELINK

TECHNICAL FIELD

The present disclosure relates generally to communication systems, and more particularly, to sidelink communication.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. Some aspects of wireless communication may comprise direct communication between devices based on sidelink. There exists a need for further improvements in sidelink technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be a device at a first UE. The device may be a processor and/or a modem at a first UE or the first UE itself. The apparatus initiates a beam pairing with a second UE, the first UE being a transmitting UE and the second UE being a receiving UE. The apparatus identifies a sidelink beam from a plurality of sidelink beams and at least one power control parameter for sidelink communication with the second UE. Different sidelink beams use different power control parameters. The apparatus communicates with the second UE via a selected sidelink beam and the at least one power control parameter.

In an aspect of the disclosure, a method, a computer-readable medium, and an apparatus are provided. The apparatus may be a device at a second UE. The device may be a processor and/or a modem at a second UE or the second UE itself. The apparatus receives a request for initiating a beam pairing with a first UE, the first UE being a transmitting UE and the second UE being a receiving UE. The apparatus transmits or receives one or more sidelink reference signals to determine a sidelink beam and associated power control parameters for sidelink communication with the first UE. Different sidelink beams use different power control parameters. The apparatus communicates with the first UE via the sidelink beam and the associated power control parameters.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
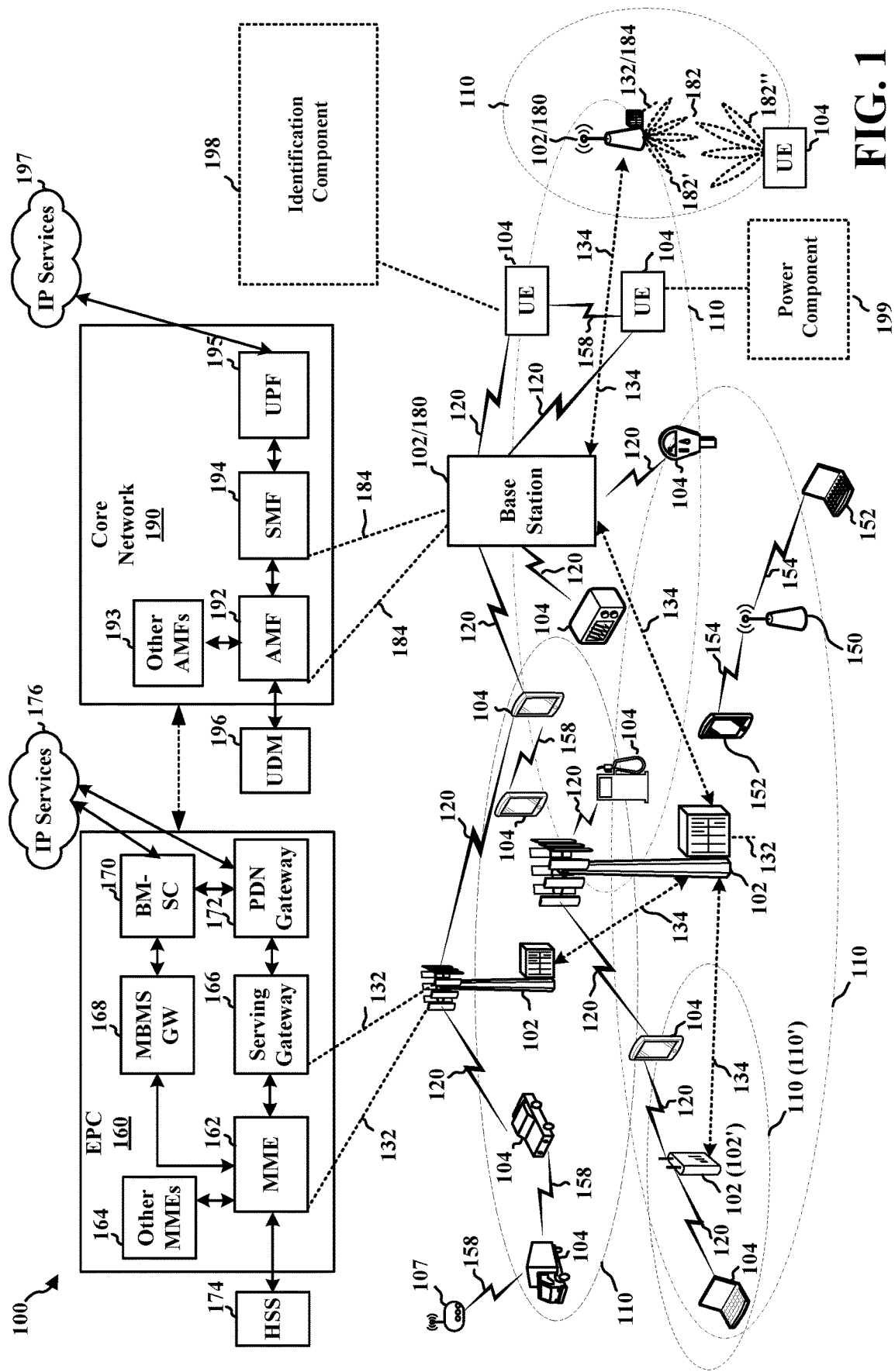
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects and implementations are described in this application by illustration to some examples, those skilled in the art will understand that additional implementations and use cases may come about in many different arrangements and scenarios. Aspects described herein may be implemented across many differing platform types, devices, systems, shapes, sizes, and packaging arrangements. For example, implementations and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described aspects may occur. Implementations may range a spectrum from chip-level or modular components to non-modular, non-chip-level implementations and further to aggregate, distributed, or original equipment manufacturer (OEM) devices or systems incorporating one or more aspects of the described aspects. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that aspects described herein may be practiced in a wide variety of devices, chip-level components, systems, distributed arrangements, end-user devices, etc. of varying sizes, shapes, and constitution.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

A link between a UE 104 and a base station 102 or 180 may be established as an access link, e.g., using a Uu interface. Other communication may be exchanged between wireless devices based on sidelink. For example, some UEs 104 may communicate with each other directly using a device-to-device (D2D) communication link 158. In some examples, the D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

Some examples of sidelink communication may include vehicle-based communication devices that can communicate from vehicle-to-vehicle (V2V), vehicle-to-infrastructure (V2I) (e.g., from the vehicle-based communication device to road infrastructure nodes such as a Road Side Unit (RSU)), vehicle-to-network (V2N) (e.g., from the vehicle-based communication device to one or more network nodes, such as a base station), vehicle-to-pedestrian (V2P), cellular vehicle-to-everything (C-V2X), and/or a combination thereof and/or with other devices, which can be collectively referred to as vehicle-to-anything (V2X) communications. Sidelink communication may be based on V2X or other D2D communication, such as Proximity Services (ProSe), etc. In addition to UEs, sidelink communication may also be transmitted and received by other transmitting and receiving devices, such as Road Side Unit (RSU) 107, etc. Sidelink communication may be exchanged using a PC5 interface, such as described in connection with the example in FIG. 2. Although the following description, including the example slot structure of FIG. 2, may provide examples for sidelink communication in connection with 5G NR, the concepts described herein may be applicable to other similar areas, such as LTE, LTE-A, CDMA, GSM, and other wireless technologies.

Referring again to FIG. 1, in certain aspects, a first UE 104, or other device communicating based on sidelink, may include an identification component 198 configured to determine a sidelink beam and corresponding power control parameter for sidelink communication with a second UE. The first UE 104 may initiate a beam pairing with a second UE, the first UE 104 being a transmitting UE and the second UE being a receiving UE. The first UE 104 may identify a sidelink beam from a plurality of sidelink beams and at least one power control parameter for sidelink communication with the second UE, wherein different sidelink beams use different power control parameters. The first UE 104 may communicate with the second UE via a selected sidelink beam and the at least one power control parameter.

Referring again to FIG. 1, in certain aspects, a second UE 104, or other device communicating based on sidelink, may include a power component 199 configured to determine a sidelink beam and corresponding power control parameter for sidelink communication with a first or transmitting UE. The second UE 104 may receive a request for initiating a beam pairing with a first UE, the first UE being a transmitting UE and the second UE being a receiving UE. The second UE 104 may transmit or receive one or more sidelink reference signals to determine a sidelink beam and associated power control parameters for sidelink communication with the first UE, wherein different sidelink beams use different power control parameters. The second UE 104 may communicate with the first UE via the sidelink beam and the associated power control parameters.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming. Similarly, beamforming may be applied for sidelink communication, e.g., between UEs.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same. Although this example is described for the base station 180 and UE 104, the aspects may be similarly applied between a first and second device (e.g., a first and second UE) for sidelink communication.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Figure 2:
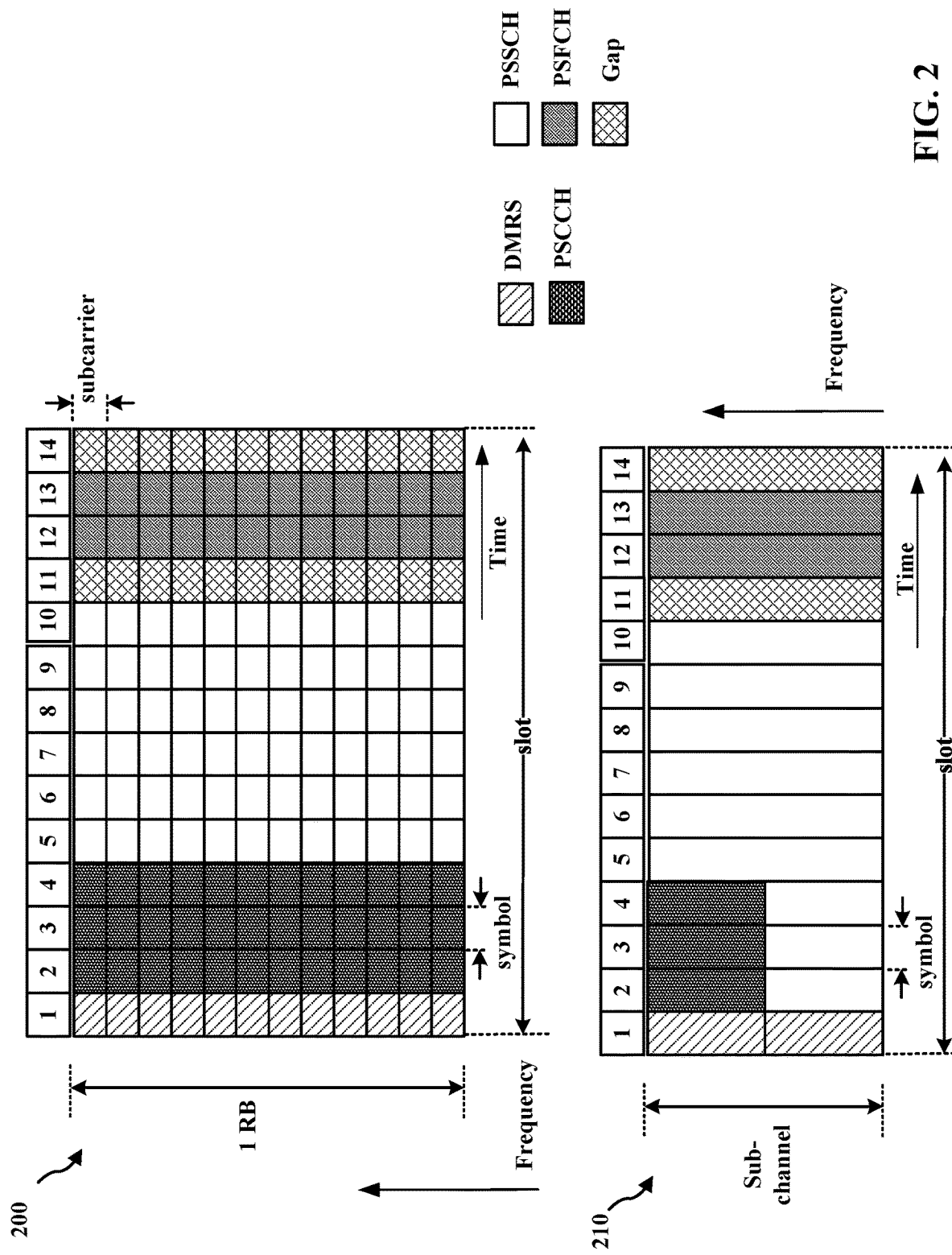
FIG. 2 illustrates example aspects of a sidelink slot structure.

FIG. 2 includes diagrams 200 and 210 illustrating example aspects of slot structures that may be used for sidelink communication (e.g., between UEs 104, RSU 107, etc.). The slot structure may be within a 5G/NR frame structure in some examples. In other examples, the slot structure may be within an LTE frame structure. Although the following description may be focused on 5G NR, the concepts described herein may be applicable to other similar areas, such as LTE, LTE-A, CDMA, GSM, and other wireless technologies. The example slot structure in FIG. 2 is merely one example, and other sidelink communication may have a different frame structure and/or different channels for sidelink communication. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. Diagram 200 illustrates a single resource block of a single slot transmission, e.g., which may correspond to a 0.5 ms transmission time interval (TTI). A physical sidelink control channel may be configured to occupy multiple physical resource blocks (PRBs), e.g., 10, 12, 15, 20, or 25 PRBs. The PSCCH may be limited to a single sub-channel. A PSCCH duration may be configured to be 2 symbols or 3 symbols, for example. A sub-channel may comprise 10, 15, 20, 25, 50, 75, or 100 PRBs, for example. The resources for a sidelink transmission may be selected from a resource pool including one or more subchannels. As a non-limiting example, the resource pool may include between 1-27 subchannels. A PSCCH size may be established for a resource pool, e.g., as between 10-100% of one subchannel for a duration of 2 symbols or 3 symbols. The diagram 210 in FIG. 2 illustrates an example in which the PSCCH occupies about 50% of a subchannel, as one example to illustrate the concept of PSCCH occupying a portion of a subchannel. The physical sidelink shared channel (PSSCH) occupies at least one subchannel. The PSCCH may include a first portion of sidelink control information (SCI), and the PSSCH may include a second portion of SCI in some examples.

A resource grid may be used to represent the frame structure. Each time slot may include a resource block (RB) (also referred to as physical RBs (PRBs)) that extends 12 consecutive subcarriers. The resource grid is divided into multiple resource elements (REs). The number of bits carried by each RE depends on the modulation scheme. As illustrated in FIG. 2, some of the REs may include control information in PSCCH and some REs may include demodulation RS (DMRS). At least one symbol may be used for feedback. FIG. 2 illustrates examples with two symbols for a physical sidelink feedback channel (PSFCH) with adjacent gap symbols. A symbol prior to and/or after the feedback may be used for turnaround between reception of data and transmission of the feedback. The gap enables a device to switch from operating as a transmitting device to prepare to operate as a receiving device, e.g., in the following slot. Data may be transmitted in the remaining REs, as illustrated. The data may comprise the data message described herein. The position of any of the data, DMRS, SCI, feedback, gap symbols, and/or LBT symbols may be different than the example illustrated in FIG. 2. Multiple slots may be aggregated together in some aspects.

Figure 3:
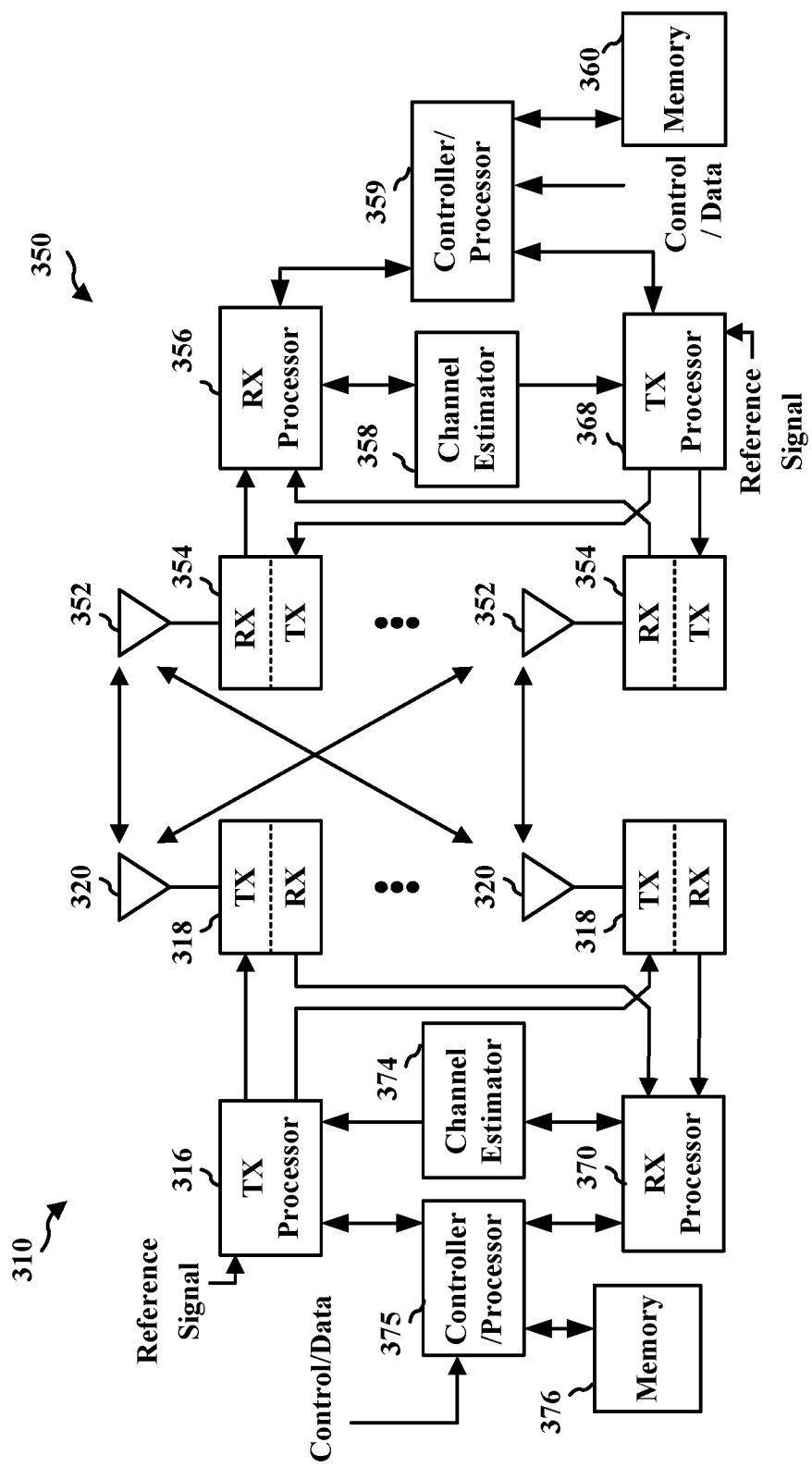
FIG. 3 is a diagram illustrating an example of a first device and a second device involved in wireless communication based, e.g., on sidelink.

FIG. 3 is a block diagram 300 of a first wireless communication device 310 in communication with a second wireless communication device 350 based on sidelink. In some examples, the devices 310 and 350 may communicate based on V2X or other D2D communication. The communication may be based on sidelink using a PC5 interface. The devices 310 and the 350 may comprise a UE, an RSU, a base station, etc. Packets may be provided to a controller/processor 375 that implements layer 3 and layer 2 functionality. Layer 3 includes a radio resource control (RRC) layer, and layer 2 includes a packet data convergence protocol (PDCP) layer, a radio link control (RLC) layer, and a medium access control (MAC) layer.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the device 350. Each spatial stream may then be provided to a different antenna 320 via a separate transmitter 318TX. Each transmitter 318TX may modulate an RF carrier with a respective spatial stream for transmission.

At the device 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the device 350. If multiple spatial streams are destined for the device 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by device 310. These soft decisions may be based on channel estimates computed by the channel estimator 358. The soft decisions are then decoded and deinterleaved to recover the data and control signals that were originally transmitted by device 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. The controller/processor 359 may provide demultiplexing between transport and logical channels, packet reassembly, deciphering, header decompression, and control signal processing. The controller/processor 359 is also responsible for error detection using an ACK and/or NACK protocol to support HARQ operations.

Similar to the functionality described in connection with the transmission by device 310, the controller/processor 359 may provide RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by device 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The transmission is processed at the device 310 in a manner similar to that described in connection with the receiver function at the device 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. The controller/processor 375 provides demultiplexing between transport and logical channels, packet reassembly, deciphering, header decompression, control signal processing. The controller/processor 375 is also responsible for error detection using an ACK and/or NACK protocol to support HARQ operations.

At least one of the TX processor 368, the RX processor 356, and the controller/processor 359 may be configured to perform aspects in connection with 198 of FIG. 1.

At least one of the TX processor 316, the RX processor 370, and the controller/processor 375 may be configured to perform aspects in connection with 198 of FIG. 1.

Figure 4:
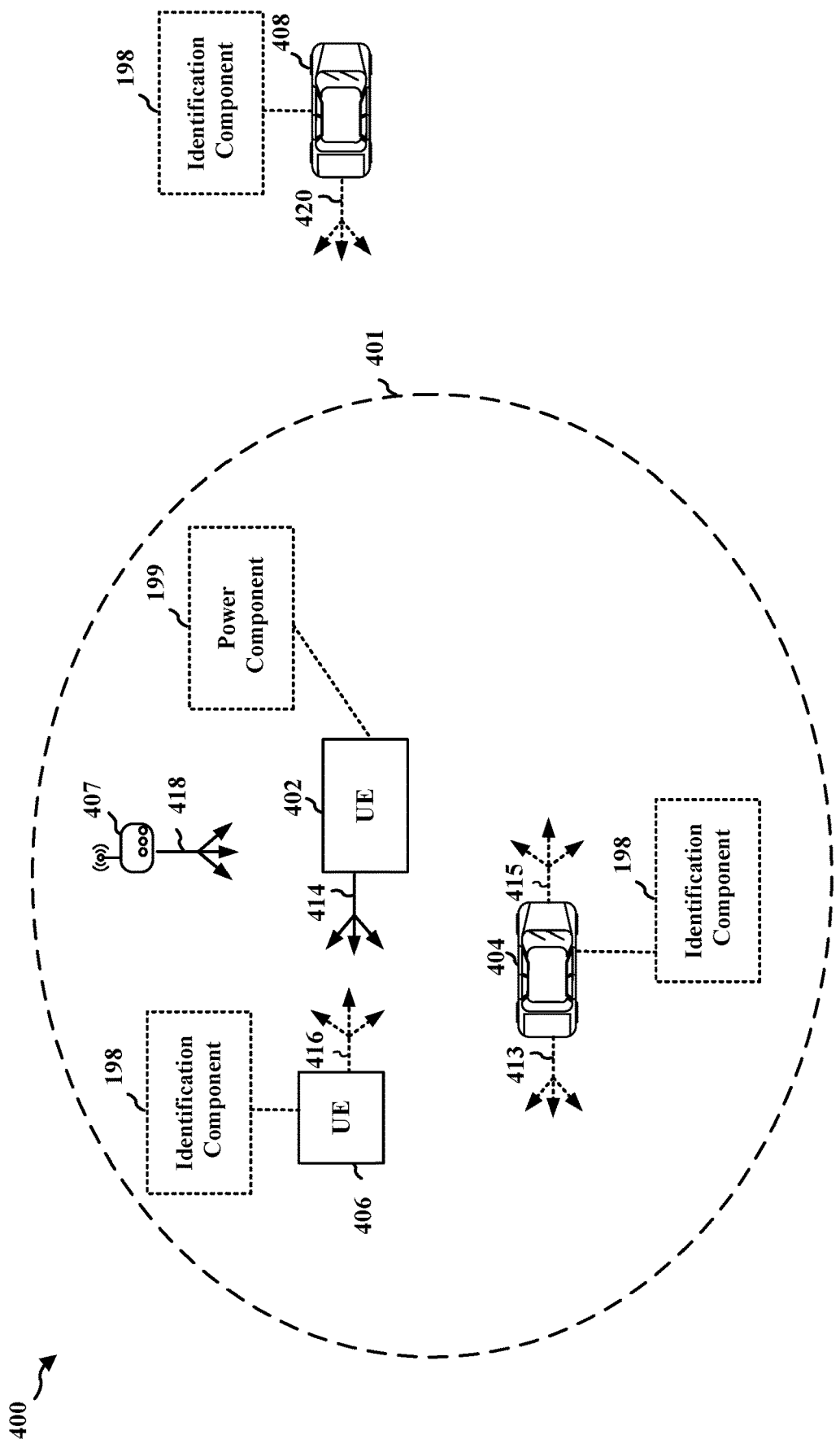
FIG. 4 illustrates example aspects of sidelink communication between devices, in accordance with aspects presented herein.

FIG. 4 illustrates an example 400 of sidelink communication between devices. The communication may be based on a slot structure comprising aspects described in connection with FIG. 2. For example, the UE 402 may transmit a sidelink transmission 414, e.g., comprising a control channel (e.g., PSCCH) and/or a corresponding data channel (e.g., PSSCH), that may be received by UEs 404, 406, 408. A control channel may include information (e.g., sidelink control information (SCI)) for decoding the data channel including reservation information, such as information about time and/or frequency resources that are reserved for the data channel transmission. For example, the SCI may indicate a number of TTIs, as well as the RBs that will be occupied by the data transmission. The SCI may also be used by receiving devices to avoid interference by refraining from transmitting on the reserved resources. The UEs 402, 404, 406, 408 may each be capable of sidelink transmission in addition to sidelink reception. Thus, UEs 404, 406, 408 are illustrated as transmitting sidelink transmissions 413, 415, 416, 420. The sidelink transmissions 413, 414, 415, 416, 420 may be unicast, broadcast or multicast to nearby devices. For example, UE 404 may transmit communication 413, 415 intended for receipt by other UEs within a range 401 of UE 404, and UE 406 may transmit communication 416. Additionally/alternatively, RSU 407 may receive communication from and/or transmit communication 418 to UEs 402, 404, 406, 408. One or more of the UEs 402, 404, 406, 408 or the RSU 407 may comprise an identification component 198 as described in connection with FIG. 1. One or more of the UEs 402, 404, 406, 408 or the RSU 407 may comprise a power component 199 as described in connection with FIG. 1.

Sidelink communication may be based on different types or modes of resource allocation mechanisms. In a first resource allocation mode (which may be referred to herein as "Mode 1"), centralized resource allocation may be provided by a network entity. For example, a base station 102 or 180 may determine resources for sidelink communication and may allocate resources to different UEs 104 to use for sidelink transmissions. In this first mode, a UE receives the allocation of sidelink resources from the base station 102 or 180. In a second resource allocation mode (which may be referred to herein as "Mode 2"), distributed resource allocation may be provided. In Mode 2, each UE may autonomously determine resources to use for sidelink transmission. In order to coordinate the selection of sidelink resources by individual UEs, each UE may use a sensing technique to monitor for resource reservations by other sidelink UEs and may select resources for sidelink transmissions from unreserved resources. Devices communicating based on sidelink, may determine one or more radio resources in the time and frequency domain that are used by other devices in order to select transmission resources that avoid collisions with other devices. The sidelink transmission and/or the resource reservation may be periodic or aperiodic, where a UE may reserve resources for transmission in a current slot and up to two future slots (discussed below).

Thus, in the second mode (e.g., Mode 2), individual UEs may autonomously select resources for sidelink transmission, e.g., without a central entity such as a base station indicating the resources for the device. A first UE may reserve the selected resources in order to inform other UEs about the resources that the first UE intends to use for sidelink transmission(s).

In some examples, the resource selection for sidelink communication may be based on a sensing-based mechanism. For instance, before selecting a resource for a data transmission, a UE may first determine whether resources have been reserved by other UEs.

For example, as part of a sensing mechanism for resource allocation mode 2, the UE may determine (e.g., sense) whether the selected sidelink resource has been reserved by other UE(s) before selecting a sidelink resource for a data transmission. If the UE determines that the sidelink resource has not been reserved by other UEs, the UE may use the selected sidelink resource for transmitting the data, e.g., in a PSSCH transmission. The UE may estimate or determine which radio resources (e.g., sidelink resources) may be in-use and/or reserved by others by detecting and decoding sidelink control information (SCI) transmitted by other UEs. The UE may use a sensing-based resource selection algorithm to estimate or determine which radio resources are in-use and/or reserved by others. The UE may receive SCI from another UE that includes reservation information based on a resource reservation field comprised in the SCI. The UE may continuously monitor for (e.g., sense) and decode SCI from peer UEs. The SCI may include reservation information, e.g., indicating slots and RBs that a particular UE has selected for a future transmission. The UE may exclude resources that are used and/or reserved by other UEs from a set of candidate resources for sidelink transmission by the UE, and the UE may select/reserve resources for a sidelink transmission from the resources that are unused and therefore form the set of candidate resources. The UE may continuously perform sensing for SCI with resource reservations in order to maintain a set of candidate resources from which the UE may select one or more resources for a sidelink transmission. Once the UE selects a candidate resource, the UE may transmit SCI indicating its own reservation of the resource for a sidelink transmission. The number of resources (e.g., sub-channels per subframe) reserved by the UE may depend on the size of data to be transmitted by the UE. Although the example is described for a UE receiving reservations from another UE, the reservations may also be received from an RSU or other device communicating based on sidelink.

In wireless communications, an uplink transmission beam includes power control parameters. The power control parameters may be for both open loop and closed loop systems. Beam based power control parameters may include P0, alpha, and PL. In sidelink communications, the power control parameters only correspond to open loop systems, and are not beam based. The power control parameters for sidelink may also comprise P0, alpha, and PL, and may be applicable to both downlink and sidelink. In frequency range 2 (FR2) systems, the sidelink power control may be beam based. For example, different sidelink beams may use different power control parameters due to different effects on interference to uplink and other sidelink transmissions.

Figure 5:
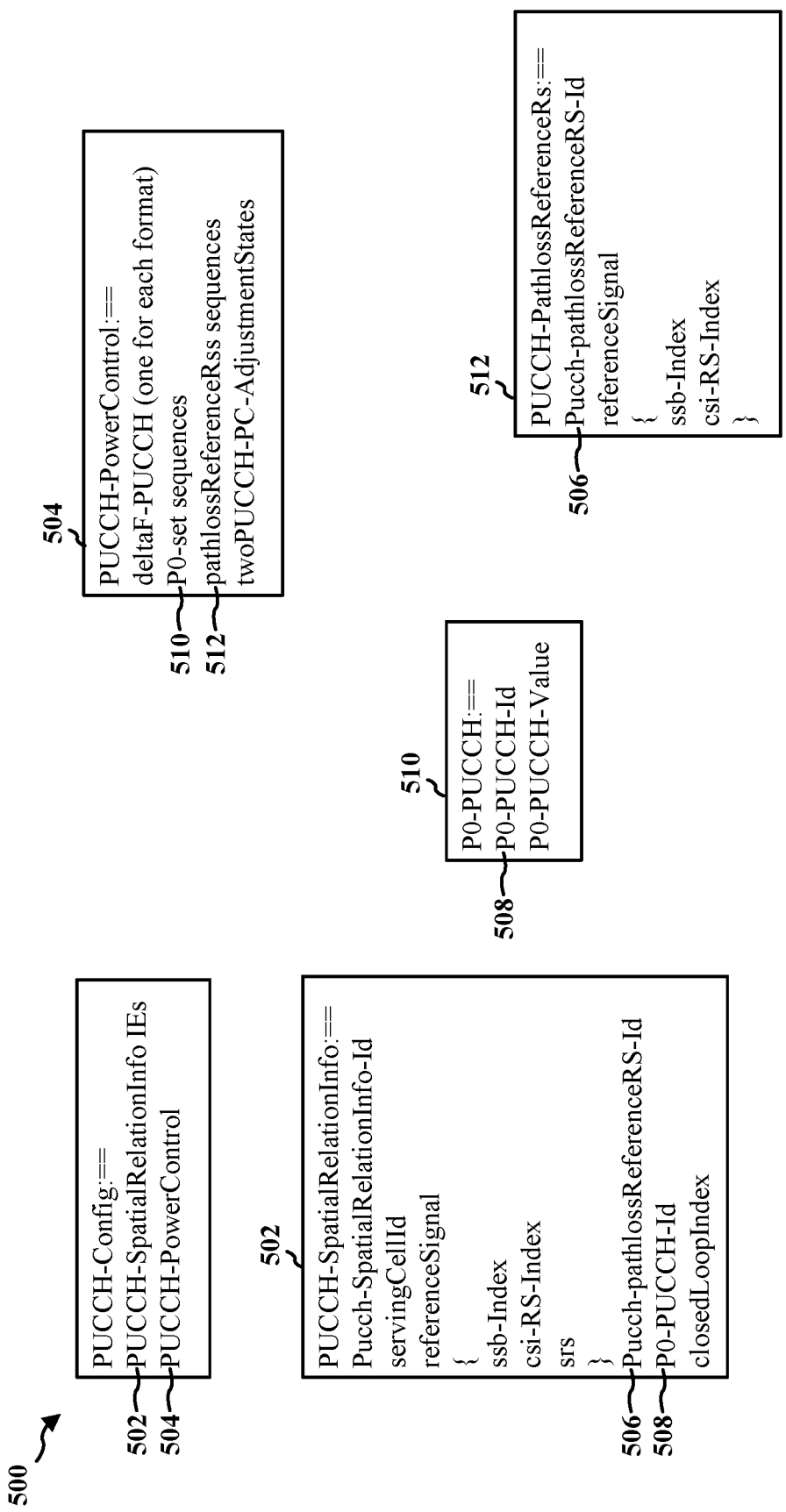
FIG. 5 is a diagram illustrating an example of sidelink power control parameters.

In uplink transmissions, for example, physical uplink control channels (PUCCHs) the beam selection and power control may be controlled by the base station. For example, the base station may set the PUCCH beam using PUCCH spatial relation activation/deactivation MAC-CE. The PUCCH beam may be indicated through SSB, CSI-RS, or SRS. For the PUCCH beam to be indicated through SSB index or CRI, the PUCCH transmission beam may be derived as a reciprocal transmission beam of the best UE receive beam that best receives the respective SSB or CSI-RS. For PUCCH beam indicated through SRI, the UE may use the transmission beam associated with the SRS indicated by SRI. The power control parameter P0 may be obtained through the mapping between p0-PUCCH-Id 508 in the PUCCH-spatialRelationInfo 502 and the p0-PUCCH-value 508 in P0-set sequences 510. The pathlossReferenceRS 512 may be obtained through the mapping between PUCCH-pathlossReferenceRS-Id 506 in the PUCCH-spatialRelationInfo 502 and the pathlossReferenceRS-Id 506 in the PUCCH-pathlossReferenceRS 512, as shown in diagram 500 of FIG. 5. The PUCCH-PowerControl 504 may comprise the P0-set sequences 510 and pathlossReferenceRS 512. The PUCCH-PowerControl 504 and the PUCCH-spatialRelationInfo 502 may be part of the PUCCH-Config.

Figure 6:
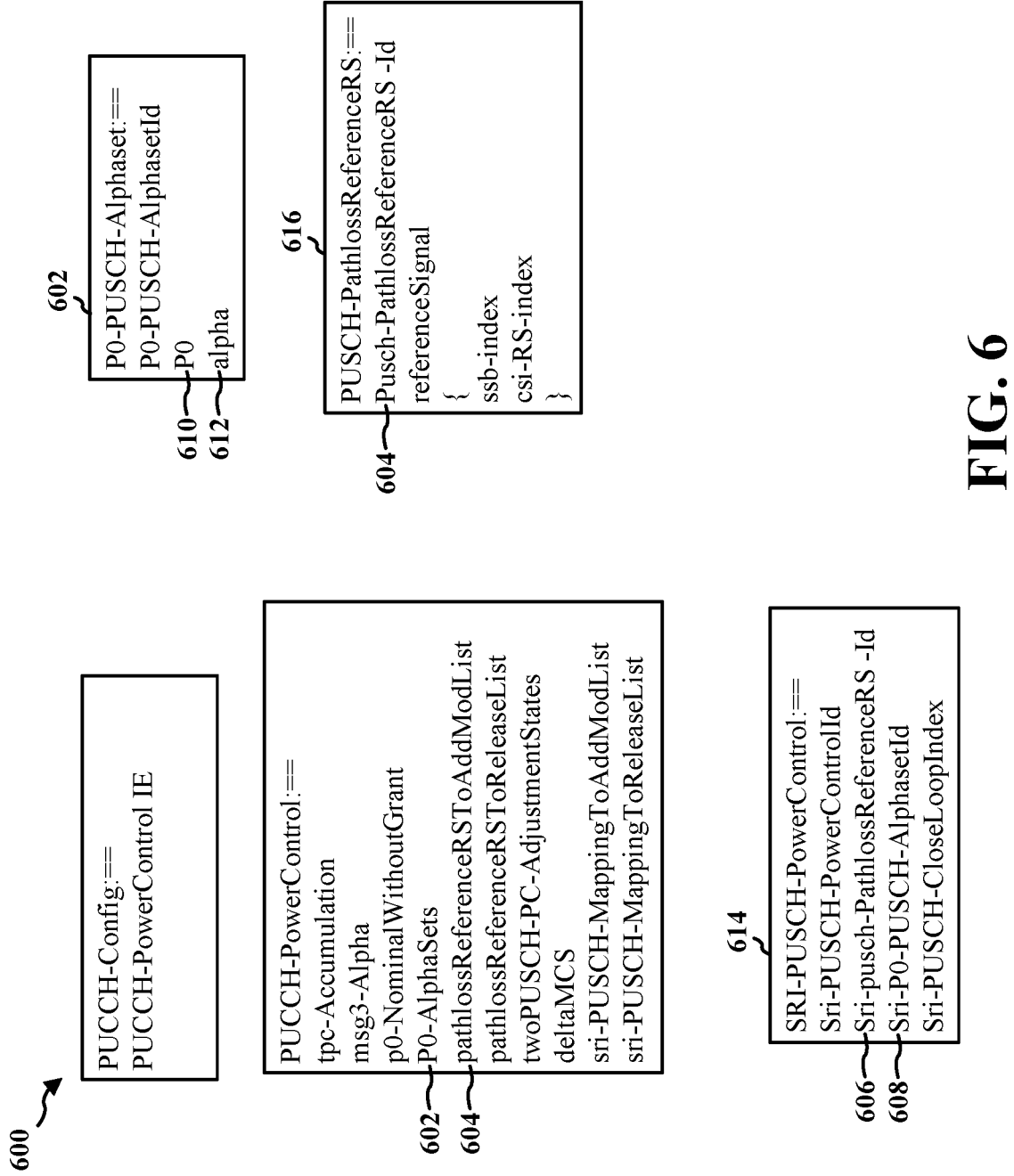
FIG. 6 is a diagram illustrating an example of sidelink power control parameters.

In some instances, the base station may set the PUSCH beam in an uplink grant using SRI. The P0 and alpha power control parameters may be obtained through the mapping between sri-p0-PUSCH-AlphasetId 608 in the SRI-PUSCH-PowerControl 614 and the p0 value 610 and alpha value 612 in P0-PUSCH-Alphaset 602. The pathlossReferenceRS (e.g., 604) may be obtained through the mapping between SRI-PUSCH-pathlossReferenceRS-ID 606 in the SRI-PUSCH-PowerControl 614 and the reference signal (e.g., Pusch-PathlossReferenceRS-Id 604) in the PUSCH-pathlossReferenceRS 616, as shown in diagram 600 of FIG. 6. The path loss reference signal (PL RS) associated with the SRI may be updated via MAC-CE.

Figure 7:
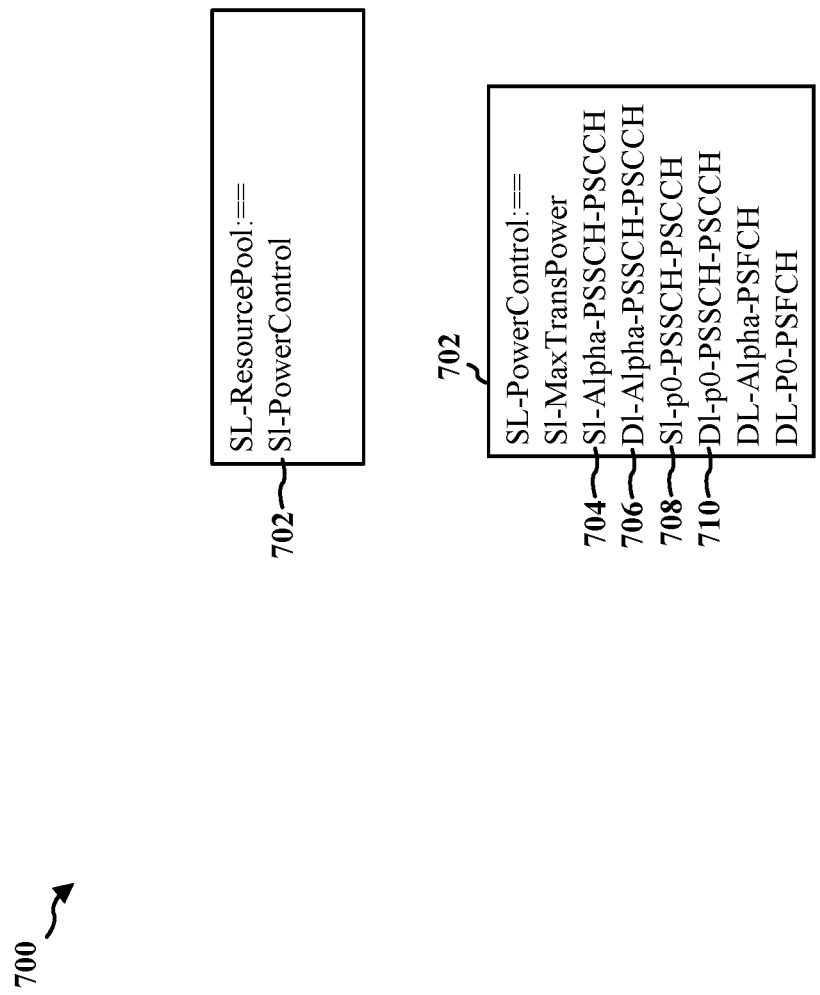
FIG. 7 is a diagram illustrating an example of sidelink power control parameters.

In some instances, the downlink path loss may be calculated similar to the PUSCH power control. The downlink PL RS resource is the one the UE may use for determining a power of a PUSCH transmission scheduled by a DCI (e.g., DCI format 0_0) in instances where the UE is configured to monitor PDCCH for detection of DCI format 0_0. The downlink PL RS resource may correspond to the SS/PBCH block the UE uses to obtain MIB when the UE is not configured to monitor PDCCH for detection of DCI format 0_0. The path loss for sidelink may be based on the reference signal power and filtered RSRP. For example, referenceSignalPower may be obtained from a PSSCH transmit power per RE summed over the antenna ports of the UE, higher layer filtered across PSSCH transmission occasions using a filter configuration provided by sl-filterCoefficient. The referenceSignalPower may be based on Sl-Alpha-PSSCH-PSCCH 704, Dl-Alpha-PSSCH-PSCCH 706, Sl0p0-PSSCH-PSCCH 708, and Dl-p0-PSSCH-PSCCH 710 of the SL-PowerControl 702, as shown in diagram 700 of FIG. 7. The higher layer filtered RSRP is an RSRP that is reported to the UE from a UE receiving the PSCCH-PSSCH transmission and may be obtained from a PSSCH DMRS using a filter configuration provided by sl-filterCoefficient. The PSCCH power may be scaled of PSSCH power by a ratio number of RBs used for PSCCH and PSSCH.

Figure 8B:
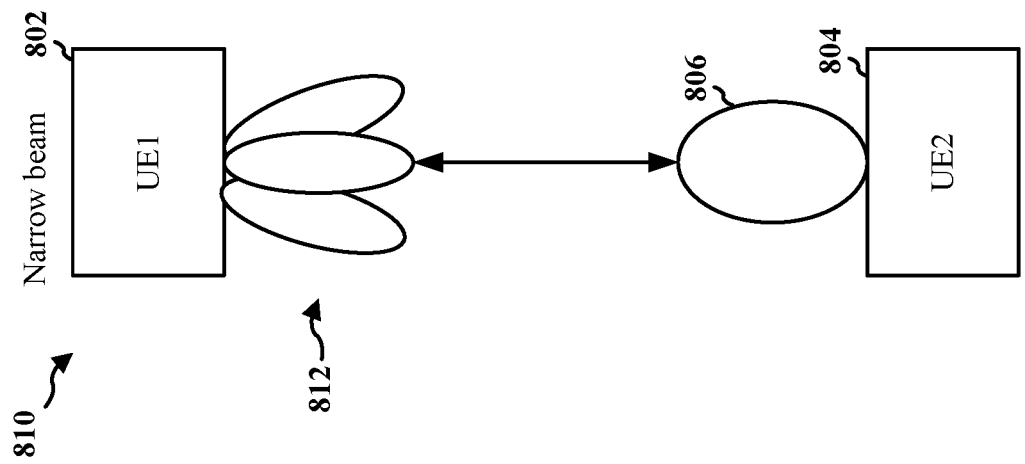
FIGS. 8A and 8B are diagrams illustrating examples of a sidelink beam pairing process.
Figure 8A:
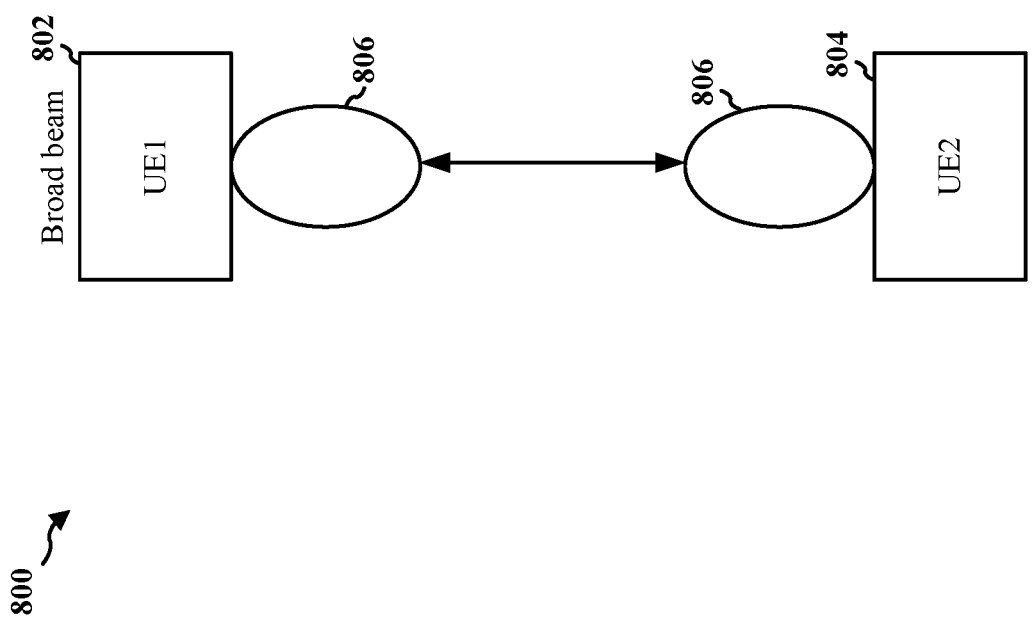

In sidelink communications, the transmitting UE may determine the transmission beam and the associated power. For example, after an initial beam pairing, the transmitting UE may use a refined beam for further data transmission. The transmission power for the refined beam may be different from the power of the initial beam used for the initial beam pairing. For example, with reference to diagram 800 of FIG. 8A, the transmitting UE (e.g., UE1 802) may use a broad beam 806 for an initial beam pairing with a receiving UE (e.g., UE2 804). After the initial beam pairing, the transmitting UE may refine the beam and utilize one or more narrow beams (e.g., 812), as shown in diagram 810 of FIG. 8B.

Aspects presented herein provide a configuration for determining a sidelink beam and associated power control parameter for sidelink communication with another UE. In some instances, different sidelink beams may use different power control parameters. Different sidelink beams may use different power control parameters due to different effects on interference to uplink and other sidelink beams.

Sidelink power control parameters may comprise sidelink PL-RS, sidelink P0 and alpha for power control, and sidelink path loss for power control. The sidelink power control parameter may be configured using RRC signaling or MAC-CE. The configuration for the power control parameter may be sent from the base station to the UE or from a sidelink UE. The setting of sidelink PL-RS may be based on the sidelink TCI state. The setting of sidelink p0 and sidelink alpha may be based on the sidelink TCI state.

The sidelink PL-RS power calculation may be based on PSSCH and/or higher layer filtered across PSSCH transmission occasions. In instances for the sidelink PL-RS is beam based, the reference signal power may be calculated from the sidelink reference signal power. Beam based filtering may be used if different beams use different transmission power. In some instances, a beam group of similar beams, such as a set of sidelink CSI-RS beams that are refined of the same sidelink SSB beam, may be considered as one beam group, such that filtering may be beam group based.

The sidelink power control parameters may be set in different instances. For example, the transmitting UE may send sidelink reference signals to the receiving UE for transmission beam and power determination. In another example, the receiving UE may send sidelink reference signals to the transmitting UE for transmission beam and power determination. In yet another example, the transmitting UE may use PSSCH sweeping for transmission beam and power determination.

In instances where the transmitting UE sends sidelink reference signals to the receiving UE, the reference signals sent by the transmitting UE may comprise CSI-RS or SSB. The PL calculation may comprise the transmitting UE sending sidelink CSI-RS or SSB, and the receiving UE may report the received RSRP to the transmitting UE in order for the transmitting UE to calculate the sidelink PL. The reported RSRP may be associated with the PL-RS index (e.g., CSI-RS index or SSB index). The receiving UE may report RSRP for multiple sidelink reference signals. In some instances, the transmitting UE may determine the sidelink transmission beam and the transmission power control parameters. In some aspects, the receiving UE may determine the sidelink transmission beam and the transmitting UE may determine the transmission power control parameters. In some aspects, the receiving UE may determine the sidelink transmission beam and the transmission power control parameters using a unified TCI framework.

In instances where the transmitting UE determines the sidelink transmission beam and the transmission power control parameters, the receiving UE may report the base set of CRI and associated RSRP, in response to the reference signals from the transmitting UE. Based on the CRI, the transmitting UE may determine the sidelink transmission beam. The p0 and alpha may be associated with the CRI. In some instances, for example in Uu RRC, the information element (IE) sl-powercontrol IE may be added to SL-resource-pool-config. In some instances, for example an out of coverage UE, the IE sl-powercontrol may be pre-configured. A configuration may include all sidelink SSB that may be associated with a same value of sl-p0 and sl-alpha, and all the sidelink CSI-RS that may be associated with another value of sl-p0 and sl-alpha. The IE Sl-PowerControl may only be known at the transmitting UE.

In instances where the receiving UE determines the sidelink transmission beam and the transmitting UE determines the transmission power control parameters, the receiving UE may report the CRI and associated RSRP for the transmitting UE to calculate the PL, in response to the transmitting UE sending the sidelink reference signals. The receiving UE may set the sidelink transmission beam using sidelink MAC-CE or SCI. The p0 and alpha may be associated with the CRI. In some instances, for example in Uu RRC, the information element (IE) sl-powercontrol IE may be added to SL-resource-pool-config. In some instances, for example an out of coverage UE, the IE sl-powercontrol may be pre-configured.

In instances where the receiving UE determines the sidelink transmission beam and the transmission power control parameters, the receiving UE may report the CRI and associated RSRP for the transmitting UE to calculate the PL, in response to the sidelink reference signals from the transmitting UE. The receiving UE may set the sidelink transmission beam using sidelink MAC-CE or SCI, which may include the P0, alpha, and sidelink reference signal in the TCI state. The QCL information in RRC configured TCI states may provide P0 and alpha. The IE sl-PowerControl may be added in RRC configuration, which may comprise Uu or PC5 RRC, and should be known at both the transmitting UE and the receiving UE. For an out of coverage UE, the sl-powercontrol IE may be pre-configured. A configuration may include all sidelink SSB that may be associated with the same value of sl-p0 and sl-alpha, and all the sidelink CSI-RS that may be associated with another value of sl-p0 and sl-alpha.

In some instances, the receiving UE may send sidelink reference signals (e.g., CSI-RS or SSB). The PL calculation may be based on the receiving UE sending sidelink reference signals and the corresponding transmission power to the transmitting UE. The transmitting UE may calculate the sidelink PL based on the received RSRP and the transmission power. For example, the transmitting UE may determine the sidelink transmission beam and the power control parameters. In another example, the receiving UE may determine the sidelink transmission beam and the power control parameters.

In instances where the transmitting UE determines the sidelink transmission beam and the power control parameters, the transmitting UE may calculate the sidelink PL. The transmitting UE may determine the sidelink transmission beam based on the sidelink reference signal index and the associated sidelink PL. The p0 and alpha may be associated with the sidelink reference signal. The IE sl-PowerControl may be added in RRC configuration, which may comprise Uu or PC5 RRC. For an out of coverage UE, the sl-powercontrol IE may be pre-configured. A configuration may include all sidelink SSB that may be associated with the same value of sl-p0 and sl-alpha, and all the sidelink CSI-RS that may be associated with another value of sl-p0 and sl-alpha, which may be known at both the transmitting UE and the receiving UE.

In instances where the receiving UE determines the sidelink transmission beam and the power control parameters, the transmitting UE may send CRI to the receiving UE, and the receiving UE may set the transmitting UE transmission beam using MAC-CE or SCI. The TCI may be configured to include the P0, alpha, and sidelink reference signal. The QCL information in RRC configured TCI states may include the P0 and alpha. The IE sl-PowerControl may be added in RRC configuration, which may comprise Uu or PC5 RRC. For an out of coverage UE, the sl-powercontrol IE may be pre-configured. A configuration may include all sidelink SSB that may be associated with the same value of sl-p0 and sl-alpha, and all the sidelink CSI-RS that may be associated with another value of sl-p0 and sl-alpha.

In instances where the transmitting UE uses PSSCH sweeping to determine the transmission beam and power, a beam index for PSSCH transmission may be included. The beam index may be within SCI. The receiving UE may calculate RSRP of the received PSSCH. The receiving UE may report the best set of PSSCH beam index and associated RSRP.

Figure 9A:
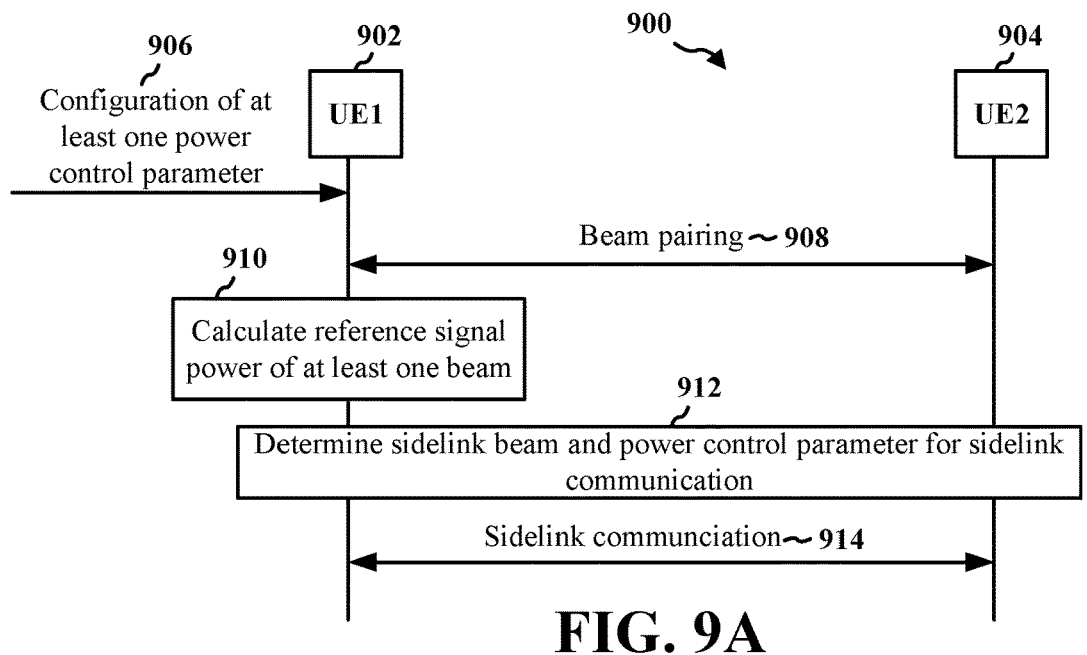
FIGS. 9A-9D are call flow diagrams of signaling between a first UE and a second UE.

FIG. 9A is a call flow diagram 900 of signaling between a first UE 902 and a second UE 904. The first UE 902 and the second UE 904 may be configured to communicate with each via sidelink communication. For example, in the context of FIG. 1, the first UE 902 or the second UE 904 may correspond to at least UE 104. In another example, in the context of FIG. 3, the first UE 902 may correspond to UE 310 and the second UE 904 may correspond to UE 350.

At 906, the first UE 902 may receive a configuration for sidelink communication. The configuration may correspond to at least one of a power control parameter for the sidelink communication. The first UE may receive the configuration for sidelink communication from a base station (not shown). The first UE may receive the configuration for sidelink communication via RRC signaling or MAC-CE.

At 908, the first UE 902 may initiate a beam pairing with the second UE 904. The first UE may comprise a transmitting UE and the second UE may comprise a receiving UE. The second UE 904 may receive a request for initiating a beam pairing with the first UE 902.

At 910, the first UE 902 may calculate a reference signal power of at least one beam from a plurality of beams. The first UE may calculate the reference signal power of the at least one beam from the plurality of beams based on a sidelink reference signal. In some aspects, the plurality of beams may be filtered if different beams have different transmission power. In some aspects, a set of sidelink beams having similar properties may be comprised within a beam group of a plurality of beam groups. A filtering of beams may be based on the plurality of beam groups.

At 912, the first UE 902 may determine a sidelink beam and power control parameter for sidelink communication. In some aspects, the first UE 902 may identify a sidelink beam from a plurality of sidelink beams and at least on power control parameter for sidelink communication with the second UE. Different sidelink beams may use different power control parameters. In some aspects, the at least one power control parameter may comprise at least one of a sidelink path loss reference signal, a sidelink path loss for power control, or a sidelink p0 and a sidelink alpha for power control. A setting of the sidelink path loss reference signal may be associated with a sidelink TCI state. A setting of the sidelink p0 or the sidelink alpha may be associated with a sidelink TCI state. In some aspects, the at least one power control parameter may be configured via RRC signaling or MAC-CE. In some aspects, the second UE 904 may transmit or receive one or more sidelink reference signals to determine a sidelink beam and associated power control parameters for sidelink communication with the first UE. In some aspects, different sidelink beams may use different power control parameters.

Figure 9B:
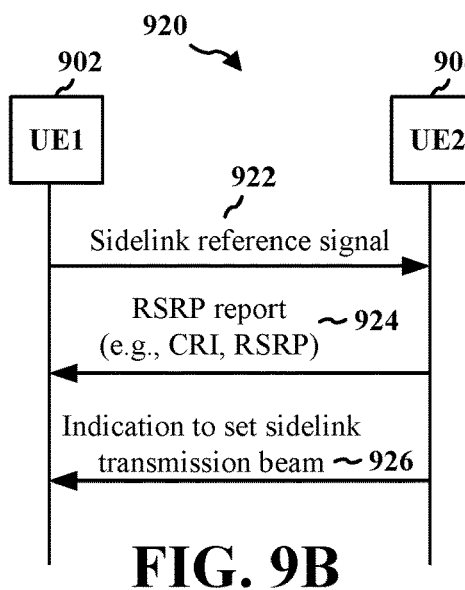

To determine the sidelink beam and power control parameter for sidelink communication, the first UE 902, with reference to diagram 920 of FIG. 9B, at 922, may transmit at least one sidelink reference signal to the second UE 904. The second UE 904 may receive the at least one reference signal from the first UE 902. A sidelink transmission beam and a transmission power may be selected based on the at least one sidelink reference signal. The at least one sidelink reference signal may comprise a channel state information reference signal (CSI-RS) or a synchronization signal block (SSB).

At 924, the second UE 904 may transmit an RSRP report comprising a CRI and an associated RSRP to the first UE 902. The first UE 902 may receive the RSRP report from the second UE 904. The RSRP report comprising the CRI and the associated RSRP may be based on the at least one sidelink reference signal received at the second UE. A sidelink path loss may be calculated based on the RSRP report. In some aspects, the sidelink transmission beam and transmission control parameters may be based at least on the RSRP report.

At 926, the second UE 904 may transmit an indication to set the sidelink transmission beam to the first UE 902. The first UE 902 may receive the indication to set the sidelink transmission beam from the second UE 904. In some aspects, the first UE may select transmission power control parameters based at least on the RSRP report. In some aspects, the indication, from the second UE, may set the sidelink transmission beam and the transmission power control parameters.

Figure 9C:
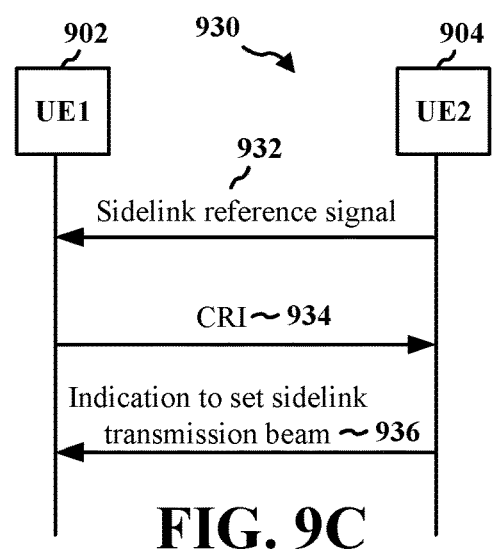

To determine the sidelink beam and power control parameter for sidelink communication, the second UE 904, with reference to diagram 930 of FIG. 9C, at 932, may transmit a sidelink reference signal and corresponding transmission power to the first UE 902. The first UE 902 may receive the sidelink reference signal and the corresponding transmission power from the second UE 904. A sidelink transmission beam and a transmission power may be selected based at least on the sidelink reference signal. In some aspects, the sidelink transmission beam may be based on a sidelink reference signal index and associated sidelink path loss.

At 934, the first UE 902 may transmit a CRI to the second UE 904. The second UE 904 may receive the CRI from the first UE 902. The transmission of the CRI may allow the second UE to determine the sidelink transmission beam and the power control parameters.

At 936, the second UE 904 may transmit an indication to set the sidelink transmission beam to the first UE 902. The first UE 902 may receive the indication to set the sidelink transmission beam from the second UE 904. The indication to set the sidelink transmission beam may be based on the CRI. In some aspects, the indication may set the sidelink transmission beam and the power control parameters. In some aspects, the indication may be transmitted via MAC-CE or SCI.

Figure 9D:
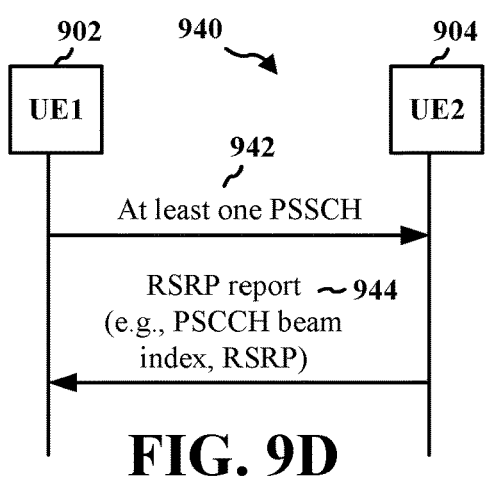

To determine the sidelink beam and power control parameter for sidelink communication, the first UE 902, with reference to diagram 940 of FIG. 9D, at 942, may transmit at least one PSSCH to the second UE 904. The second UE may receive the at least one PSSCH from the first UE 902. In some aspects, transmission of the at least one PSSCH may allow the first UE to use PSSCH sweeping to determine the sidelink transmission beam and the transmission power. A beam index may be included for the PSSCH transmission. In some aspects, the beam index may be provided via SCI. In some aspects, the second UE may calculate the RSRP of the at least one PSSCH from the first UE, such that the second UE may provide a subset of PSSCH beam indexes and associated RSRP. The subset of PSSCH beam indexes may correspond to the PSSCHs having the highest RSRP at the second UE.

At 944, the second UE 904 may transmit an RSRP report comprising a PSCCH beam index and an associated RSRP to the first UE 902. The first UE 902 may receive the PSCCH beam index and the associated RSRP from the second UE 904. The RSRP report comprising the PSCCH beam index and the associated RSRP may be based on the at least one PSSCH. A sidelink transmission beam and a transmission power may be selected based on RSRP report.

At 914, the first UE 902 may communicate with the second UE 904 over sidelink communication via a selected sidelink beam and the at least one power control parameter.

Figure 10:
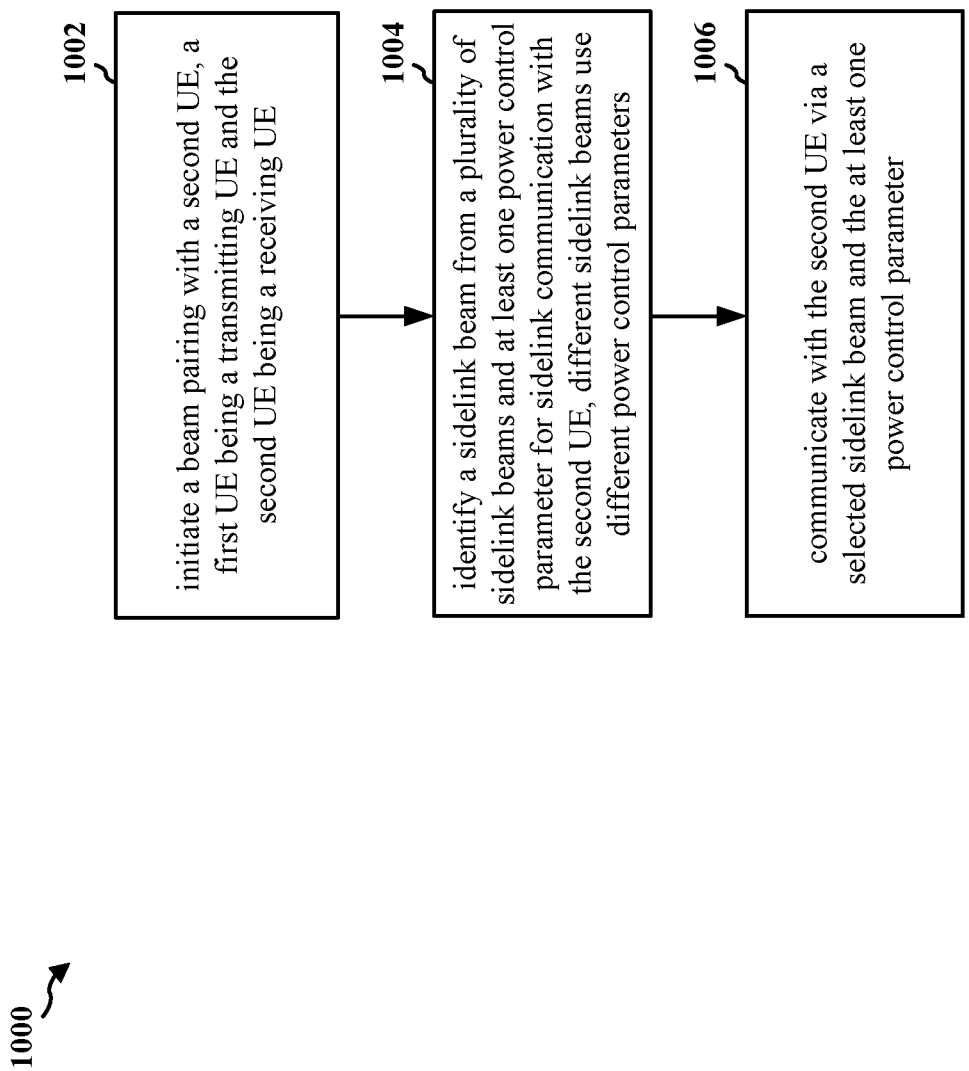
FIG. 10 is a flowchart of a method of wireless communication.

FIG. 10 is a flowchart 1000 of a method of wireless communication. The method may be performed by a UE or a component of a UE (e.g., the UE 104; the apparatus 1202; the cellular baseband processor 1204, which may include the memory 360 and which may be the entire UE 350 or a component of the UE 350, such as the TX processor 368, the RX processor 356, and/or the controller/processor 359). One or more of the illustrated operations may be omitted, transposed, or contemporaneous. The method may allow a transmitting UE to determine a sidelink beam and corresponding power control parameter for sidelink communication with a second UE.

At 1002, the first UE may initiate a beam pairing with a second UE. For example, 1002 may be performed by beam pairing component 1242 of apparatus 1202. The first UE may comprise a transmitting UE and the second UE may comprise a receiving UE.

At 1004, the first UE may identify a sidelink beam from a plurality of sidelink beams and at least on power control parameter for sidelink communication with the second UE. For example, 1004 may be performed by power component 1244 of apparatus 1202. Different sidelink beams may use different power control parameters. In some aspects, the at least one power control parameter may comprise at least one of a sidelink path loss reference signal, a sidelink path loss for power control, or a sidelink p0 and a sidelink alpha for power control. A setting of the sidelink path loss reference signal may be associated with a sidelink transmission configuration indicator (TCI) state. A setting of the sidelink p0 or the sidelink alpha may be associated with a sidelink TCI state. In some aspects, the at least one power control parameter may be configured via radio resource control (RRC) signaling or medium access control (MAC) control element (CE) (MAC-CE).

At 1006, the first UE may communicate with the second UE. For example, 1006 may be performed by communication component 1254 of apparatus 1202. The first UE may communicate with the second UE via a selected sidelink beam and the at least one power control parameter.

Figure 11:
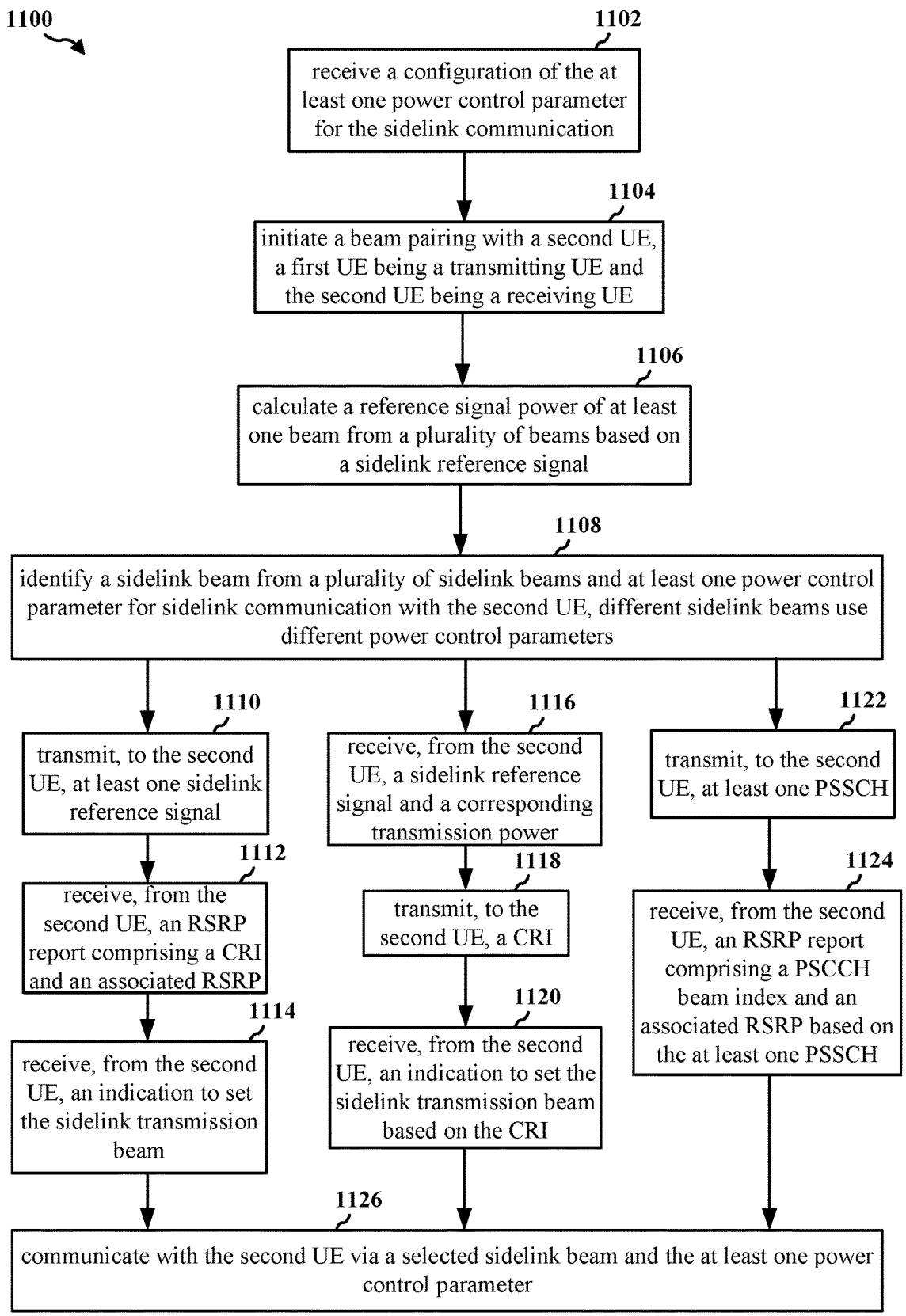
FIG. 11 is a flowchart of a method of wireless communication.

FIG. 11 is a flowchart 1100 of a method of wireless communication. The method may be performed by a UE or a component of a UE (e.g., the UE 104; the apparatus 1202; the cellular baseband processor 1204, which may include the memory 360 and which may be the entire UE 350 or a component of the UE 350, such as the TX processor 368, the RX processor 356, and/or the controller/processor 359). One or more of the illustrated operations may be omitted, transposed, or contemporaneous. The method may allow a transmitting UE to determine a sidelink beam and corresponding power control parameter for sidelink communication with a second UE.

At 1102, the first UE may receive a configuration for sidelink communication. For example, 1102 may be performed by configuration component 1240 of apparatus 1202. The configuration may correspond to at least one of a power control parameter for the sidelink communication. The first UE may receive the configuration for sidelink communication from a base station. The first UE may receive the configuration for sidelink communication via RRC signaling or MAC-CE.

At 1104, the first UE may initiate a beam pairing with a second UE. For example, 1104 may be performed by beam pairing component 1242 of apparatus 1202. The first UE may comprise a transmitting UE and the second UE may comprise a receiving UE.

At 1106, the first UE may calculate a reference signal power of at least one beam from a plurality of beams. For example, 1106 may be performed by power component 1244 of apparatus 1202. The first UE may calculate the reference signal power of the at least one beam from the plurality of beams based on a sidelink reference signal. In some aspects, the plurality of beams may be filtered if different beams have different transmission power. In some aspects, a set of sidelink beams having similar properties may be comprised within a beam group of a plurality of beam groups. A filtering of beams may be based on the plurality of beam groups.

At 1108, the first UE may identify a sidelink beam from a plurality of sidelink beams and at least on power control parameter for sidelink communication with the second UE. For example, 1108 may be performed by power component 1244 of apparatus 1202. Different sidelink beams may use different power control parameters. In some aspects, the at least one power control parameter may comprise at least one of a sidelink path loss reference signal, a sidelink path loss for power control, or a sidelink p0 and a sidelink alpha for power control. A setting of the sidelink path loss reference signal may be associated with a sidelink TCI state. A setting of the sidelink p0 or the sidelink alpha may be associated with a sidelink TCI state. In some aspects, the at least one power control parameter may be configured via RRC signaling or MAC-CE.

At 1110, the first UE may transmit at least one sidelink reference signal. For example, 1110 may be performed by RS component 1248 of apparatus 1202. The first UE may transmit the at least one sidelink reference signal to the second UE. A sidelink transmission beam and a transmission power may be selected based on the at least one sidelink reference signal. The at least one sidelink reference signal may comprise a CSI-RS or an SSB.

At 1112, the first UE may receive a reference signal received power (RSRP) report comprising a CSI-RS resource indicator (CRI) and an associated RSRP. For example, 1112 may be performed by RS component 1248 of apparatus 1202. The first UE may receive the RSRP report from the second UE. The first UE may receive the RSRP report comprising the CRI and the associated RSRP based on the at least one sidelink reference signal received at the second UE. A sidelink path loss may be calculated based on the RSRP report. In some aspects, the sidelink transmission beam and transmission control parameters may be based at least on the RSRP report.

At 1114, the first UE may receive an indication to set the sidelink transmission beam. For example, 1114 may be performed by beam component 1250 of apparatus 1202. The first UE may receive the indication to set the sidelink transmission beam from the second UE. In some aspects, the first UE may select transmission power control parameters based at least on the RSRP report. In some aspects, the indication, from the second UE, may set the sidelink transmission beam and the transmission power control parameters.

At 1116, the first UE may receive a sidelink reference signal and a corresponding transmission power. For example, 1116 may be performed by RS component 1248 of apparatus 1202. The first UE may receive the sidelink reference signal and the corresponding transmission power from the second UE. A sidelink transmission beam and a transmission power may be selected based at least on the sidelink reference signal. In some aspects, the sidelink transmission beam may be based on a sidelink reference signal index and associated sidelink path loss.

At 1118, the first UE may transmit a CRI. For example, 1118 may be performed by RS component 1248 of apparatus 1202. The first UE may transmit the CRI to the second UE. The transmission of the CRI may allow the second UE to determine the sidelink transmission beam and the power control parameters.

At 1120, the first UE may receive an indication to set the sidelink transmission beam. For example, 1120 may be performed by beam component 1250 of apparatus 1202. The first UE may receive the indication to set the sidelink transmission beam from the second UE. The indication may set the sidelink transmission beam based on the CRI. In some aspects, the indication may set the sidelink transmission beam and the power control parameters. In some aspects, the indication may be received via MAC-CE or sidelink control information (SCI).

At 1122, the first UE may transmit at least one PSSCH. For example, 1122 may be performed by PSSCH component 1252 of apparatus 1202. The first UE may transmit the at least one PSSCH to the second UE. In some aspects, transmission of the at least one PSSCH may allow the first UE to use PSSCH sweeping to determine the sidelink transmission beam and the transmission power. A beam index may be included for the PSSCH transmission. In some aspects, the beam index may be provided via SCI. In some aspects, the second UE may calculate the RSRP of the at least one PSSCH from the first UE, such that the second UE may provide a subset of PSSCH beam indexes and associated RSRP. The subset of PSSCH beam indexes may correspond to the PSSCHs having the highest RSRP at the second UE.

At 1124, the first UE may receive an RSRP report comprising a PSCCH beam index and an associated RSRP. For example, 1124 may be performed by beam component 1250 of apparatus 1202. The first UE may receive the RSRP report from the second UE. The RSRP report comprising the PSCCH beam index and the associated RSRP may be based on the at least one PSSCH. A sidelink transmission beam and a transmission power are selected based on RSRP report.

At 1126, the first UE may communicate with the second UE. For example, 1126 may be performed by communication component 1254 of apparatus 1202. The first UE may communicate with the second UE via a selected sidelink beam and the at least one power control parameter.

Figure 12:
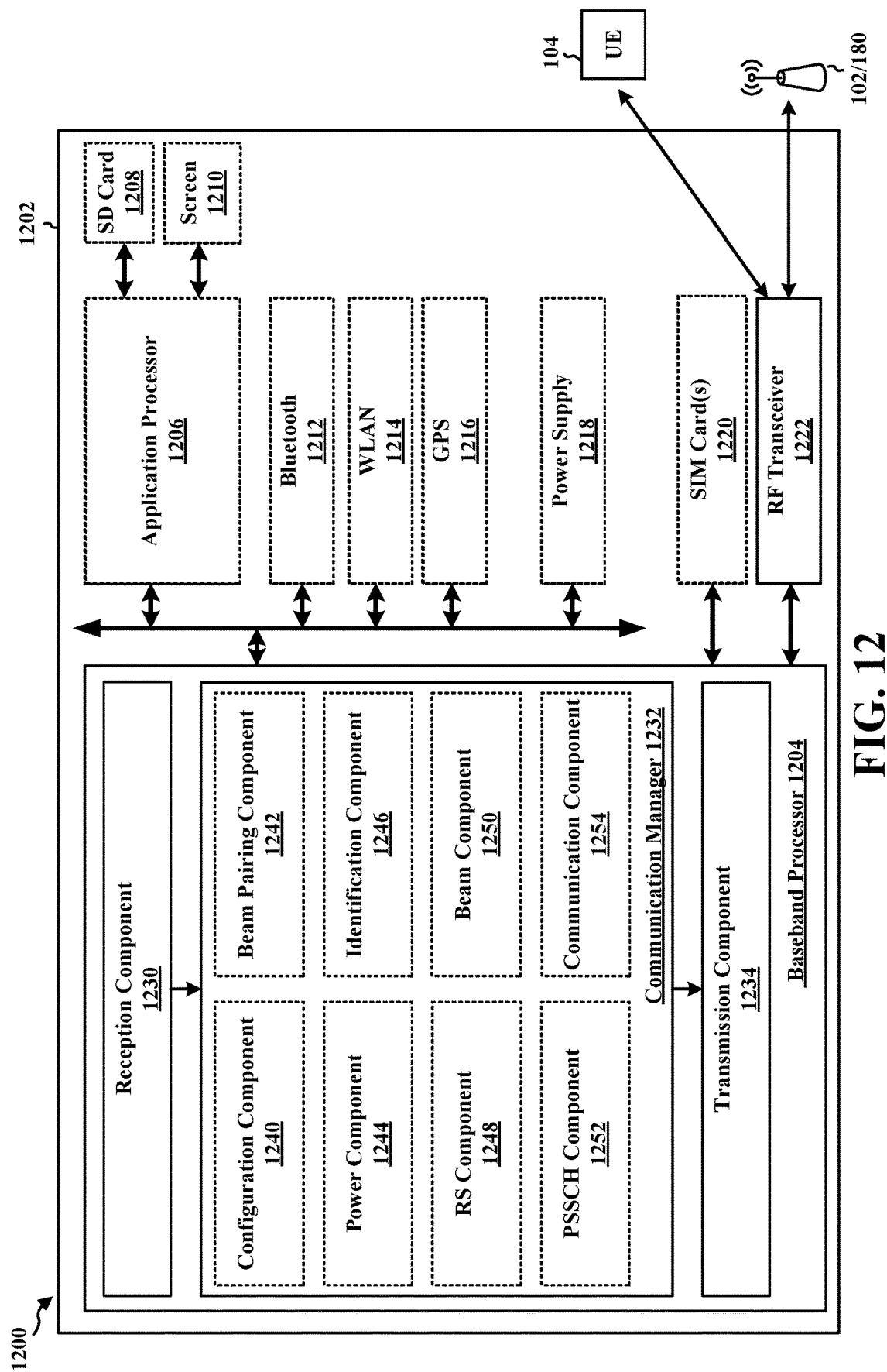
FIG. 12 is a diagram illustrating an example of a hardware implementation for an example apparatus.

FIG. 12 is a diagram 1200 illustrating an example of a hardware implementation for an apparatus 1202. The apparatus 1202 may be a UE, or another device configured to transmit and/or receive sidelink communication. The apparatus 1202 includes a baseband processor 1204 (also referred to as a modem) coupled to a RF transceiver 1222. In some aspects, the baseband processor 1204 may be a cellular baseband processor and/or the RF transceiver 1222 may be a cellular RF transceiver. The apparatus 1202 may further include one or more subscriber identity modules (SIM) cards 1220, an application processor 1206 coupled to a secure digital (SD) card 1208 and a screen 1210, a Bluetooth module 1212, a wireless local area network (WLAN) module 1214, a Global Positioning System (GPS) module 1216, and/or a power supply 1218. The baseband processor 1204 communicates through the RF transceiver 1222 with the UE 104 and/or BS 102/180. The baseband processor 1204 may include a computer-readable medium/memory. The computer-readable medium/memory may be non-transitory. The baseband processor 1204 is responsible for general processing, including the execution of software stored on the computer-readable medium/memory. The software, when executed by the baseband processor 1204, causes the baseband processor 1204 to perform the various functions described in the present application. The computer-readable medium/memory may also be used for storing data that is manipulated by the baseband processor 1204 when executing software. The baseband processor 1204 further includes a reception component 1230, a communication manager 1232, and a transmission component 1234. The communication manager 1232 includes the one or more illustrated components. The components within the communication manager 1232 may be stored in the computer-readable medium/memory and/or configured as hardware within the baseband processor 1204. The baseband processor 1204 may be a component of the device 350 and may include the memory 360 and/or at least one of the TX processor 368, the RX processor 356, and the controller/processor 359. In one configuration, the apparatus 1202 may be a modem chip and include just the baseband processor 1204, and in another configuration, the apparatus 1202 may be the entire UE (e.g., see 350 of FIG. 3) and include the additional modules of the apparatus 1202.

The communication manager 1232 includes a configuration component 1240 that is configured to receive a configuration for sidelink communication, e.g., as described in connection with 1102 of FIG. 11. The communication manager 1232 further includes a beam pairing component 1242 that is configured to initiate a beam pairing with a second UE, e.g., as described in connection with 1002 of FIG. 10 or 1104 of FIG. 11. The communication manager 1232 further includes a power component 1244 that is configured to calculate a reference signal power of at least one beam from a plurality of beams, e.g., as described in connection with 1106 of FIG. 11. The communication manager 1232 further includes an identification component 1246 that is configured to identify a sidelink beam from a plurality of sidelink beams and at least on power control parameter for sidelink communication with the second UE, e.g., as described in connection with 1004 of FIG. 10 or 1108 of FIG. 11. The communication manager 1232 further includes an RS component 1248 that is configured to transmit at least one sidelink reference signal, e.g., as described in connection with 1110 of FIG. 11. The RS component 1248 may be further configured to receive an RSRP report comprising a CRI and an associated RSRP, e.g., as described in connection with 1112 of FIG. 11. The RS component 1248 may be further configured to receive a sidelink reference signal and a corresponding transmission power, e.g., as described in connection with 1116 of FIG. 11. The RS component 1248 may be further configured to transmit a CRI, e.g., as described in connection with 1118 of FIG. 11. The communication manager 1232 further includes a beam component 1250 that is configured to receive an indication to set the sidelink transmission beam, e.g., as described in connection with 1114 of FIG. 11. The beam component 1250 may be further configured to receive an indication to set the sidelink transmission beam, e.g., as described in connection with 1120 of FIG. 11. The beam component 1250 may be further configured to receive an RSRP report comprising a PSCCH beam index and an associated RSRP, e.g., as described in connection with 1124 of FIG. 11. The communication manager 1232 further includes a PSSCH component 1252 that is configured to transmit at least one PSSCH, e.g., as described in connection with 1122 of FIG. 11. The communication manager 1232 further includes a communication component 1254 that is configured to communicate with the second UE, e.g., as described in connection with 1006 of FIG. 10 or 1126 of FIG. 11.

The apparatus may include additional components that perform each of the blocks of the algorithm in the flowcharts of FIGS. 10 and 11. As such, each block in the flowcharts of FIGS. 10 and 11 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1202, and in particular the baseband processor 1204, includes means for initiating a beam pairing with a second UE, the first UE being a transmitting UE and the second UE being a receiving UE. The apparatus includes means for identifying a sidelink beam from a plurality of sidelink beams and at least one power control parameter for sidelink communication with the second UE. Different sidelink beams use different power control parameters. The apparatus includes means for communicating with the second UE via a selected sidelink beam and the at least one power control parameter. The apparatus further includes means for receiving a configuration of the at least one power control parameter for the sidelink communication. The apparatus further includes means for calculating a reference signal power of at least one beam from a plurality of beams based on a sidelink reference signal. The apparatus further includes means for transmitting, to the second UE, at least one sidelink reference signal. A sidelink transmission beam and a transmission power are selected based on the at least one sidelink reference signal. The apparatus further includes means for receiving, from the second UE, an RSRP report comprising a CRI and an associated RSRP based on the at least one sidelink reference signal received at the second UE. A sidelink path loss is calculated based on the RSRP report. The apparatus further includes means for receiving, from the second UE, an indication to set the sidelink transmission beam. The first UE selects transmission power control parameters based at least on the RSRP report. The apparatus further includes means for receiving, from the second UE, an indication to set the sidelink transmission beam and transmission power control parameters. The apparatus further includes means for receiving, from the second UE, a sidelink reference signal and a corresponding transmission power. A sidelink transmission beam and a transmission power are selected based at least on the sidelink reference signal. The apparatus further includes means for transmitting, to the second UE, a CRI. The apparatus further includes means for receiving, from the second UE, an indication to set the sidelink transmission beam based on the CRI. The apparatus further includes means for transmitting, to the second UE, at least one PSSCH. The apparatus further includes means for receiving, from the second UE, an RSRP report comprising a PSCCH beam index and an associated RSRP based on the at least one PSSCH. A sidelink transmission beam and a transmission power are selected based on RSRP report. The means may be one or more of the components of the apparatus 1202 configured to perform the functions recited by the means. As described herein, the apparatus 1202 may include the TX Processor 368, the RX Processor 356, and the controller/processor 359. As such, in one configuration, the means may be the TX Processor 368, the RX Processor 356, and the controller/processor 359 configured to perform the functions recited by the means.

Figure 13:
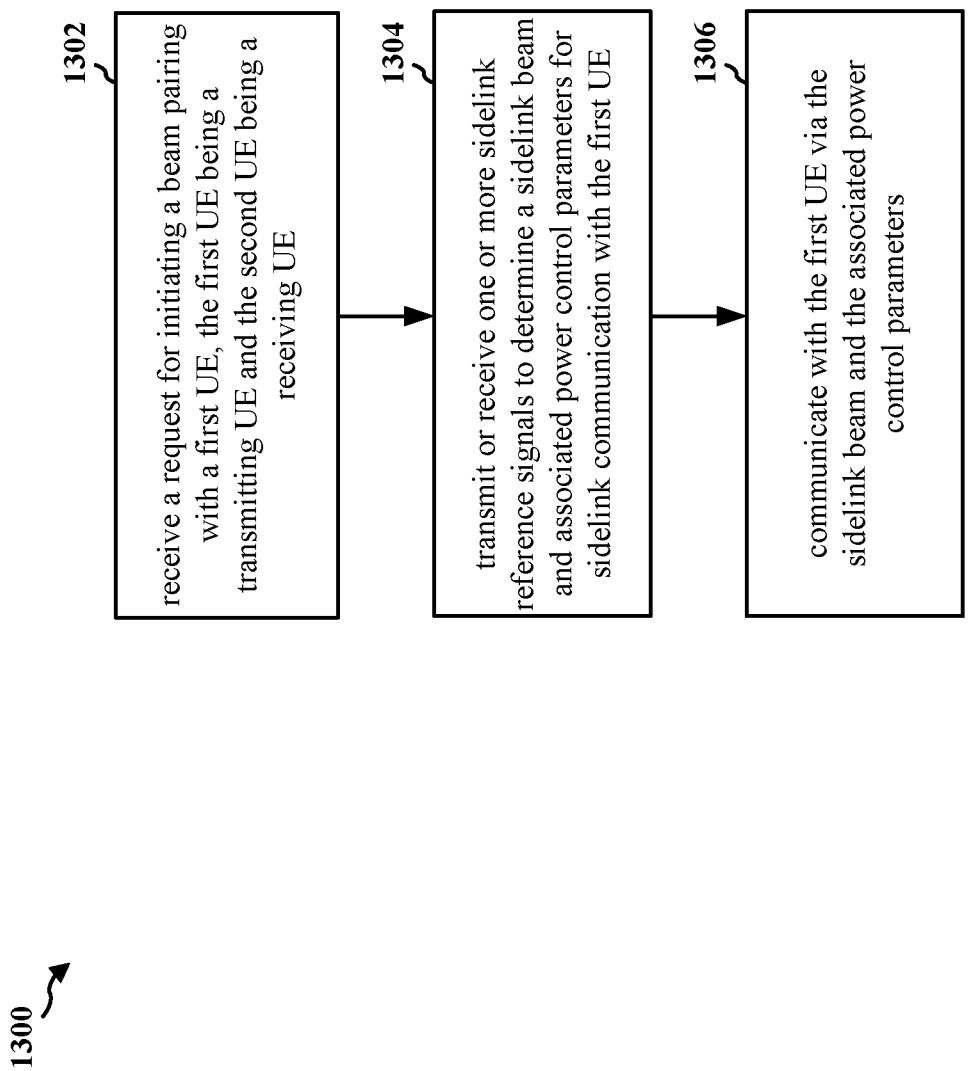
FIG. 13 is a flowchart of a method of wireless communication.

FIG. 13 is a flowchart 1300 of a method of wireless communication. The method may be performed by a UE or a component of a UE (e.g., the UE 104; the apparatus 1502; the cellular baseband processor 1504, which may include the memory 360 and which may be the entire UE 350 or a component of the UE 350, such as the TX processor 368, the RX processor 356, and/or the controller/processor 359). One or more of the illustrated operations may be omitted, transposed, or contemporaneous. The method may allow a receiving UE to determine a sidelink beam and corresponding power control parameter for sidelink communication with a first or transmitting UE.

At 1302, the second UE may receive a request for initiating a beam pairing with a first UE. For example, 1302 may be performed by beam pairing component 1540 of apparatus 1502. The first UE may be a transmitting UE and the second UE maybe a receiving UE.

At 1304, the second UE may transmit or receive one or more sidelink reference signals. For example, 1304 may be performed by power component 1542 of apparatus 1502. The second UE may transmit or receive the one or more sidelink reference signals to determine a sidelink beam and associated power control parameters for sidelink communication with the first UE. In some aspects, different sidelink beams may use different power control parameters.

At 1306, the second UE may communicate with the first UE. For example, 1306 may be performed by communication component 1550 of apparatus 1502. The second UE may communicate with the first UE via the sidelink beam and the associated power control parameters.

Figure 14:
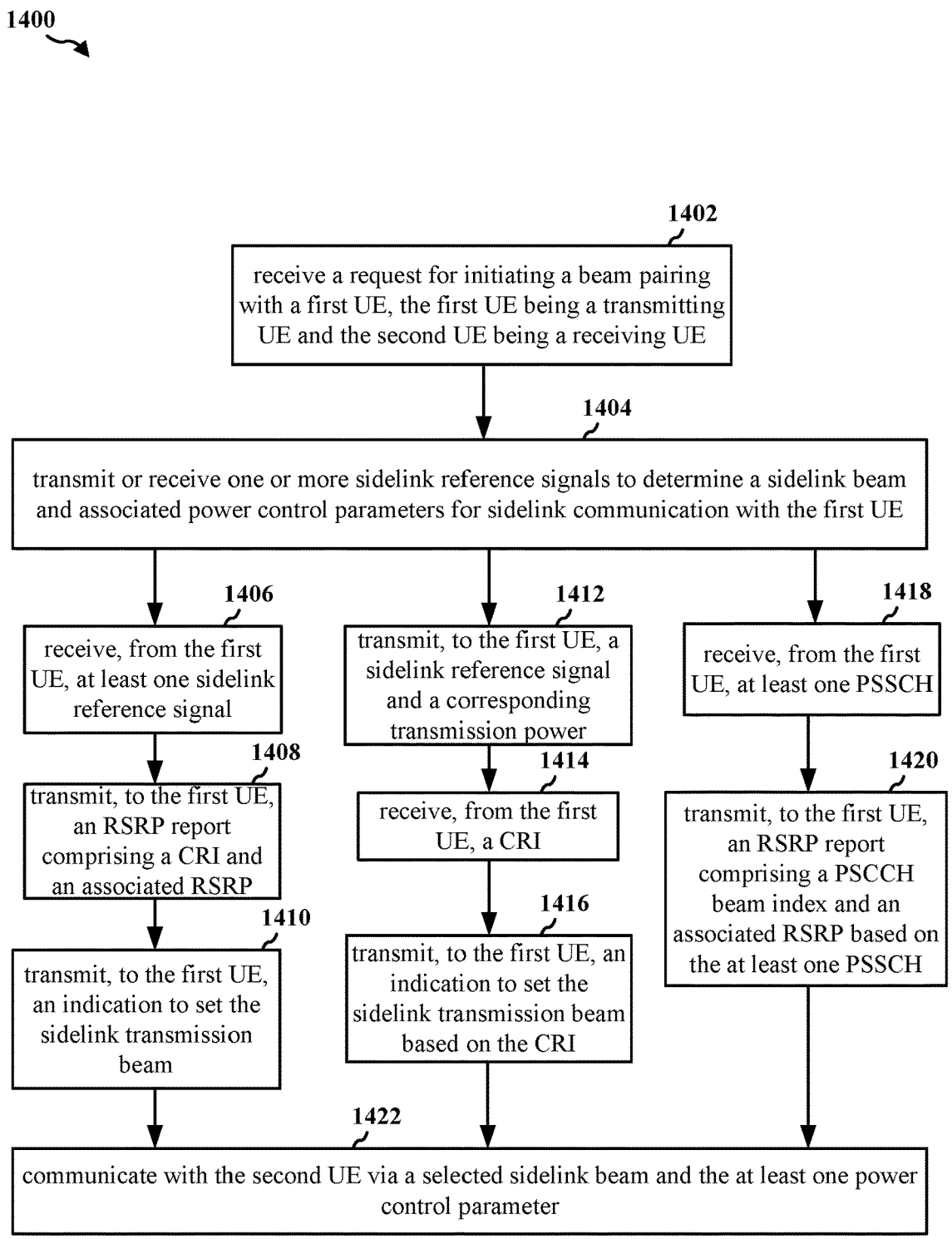
FIG. 14 is a flowchart of a method of wireless communication.

FIG. 14 is a flowchart 1400 of a method of wireless communication. The method may be performed by a UE or a component of a UE (e.g., the UE 104; the apparatus 1502; the cellular baseband processor 1504, which may include the memory 360 and which may be the entire UE 350 or a component of the UE 350, such as the TX processor 368, the RX processor 356, and/or the controller/processor 359). One or more of the illustrated operations may be omitted, transposed, or contemporaneous. The method may allow a receiving UE to determine a sidelink beam and corresponding power control parameter for sidelink communication with a first or transmitting UE.

At 1402, the second UE may receive a request for initiating a beam pairing with a first UE. For example, 1402 may be performed by beam pairing component 1542 of apparatus 1502. The first UE may be a transmitting UE and the second UE maybe a receiving UE.

At 1404, the second UE may transmit or receive one or more sidelink reference signals. For example, 1404 may be performed by power component 1542 of apparatus 1502. The second UE may transmit or receive the one or more sidelink reference signals to determine a sidelink beam and associated power control parameters for sidelink communication with the first UE. In some aspects, different sidelink beams may use different power control parameters.

At 1406, the second UE may receive at least one sidelink reference signal. For example, 1406 may be performed by RS component 1544 of apparatus 1502. The second UE may receive the at least one sidelink reference signal from the first UE. A sidelink transmission beam and a transmission power may be selected based on the at least one sidelink reference signal. In some aspects, the at least one sidelink reference signal may comprise a CSI-RS or an SSB.

At 1408, the second UE may transmit an RSRP report comprising a CRI and an associated RSRP. For example, 1408 may be performed by RS component 1544 of apparatus 1502. The second UE may transmit the RSRP report to the first UE. The RSRP report comprising the CRI and the associated RSRP may be based on the at least one sidelink reference signal received at the second UE. A sidelink path loss may be calculated based on the RSRP report. In some aspects, the sidelink transmission beam and transmission control parameters may be based at least on the RSRP report.

At 1410, the second UE may transmit an indication to set the sidelink transmission beam. For example, 1410 may be performed by beam component 1546 of apparatus 1502. The second UE may transmit the indication to set the sidelink transmission beam to the first UE. In some aspects, the first UE may select transmission power control parameters based at least on the RSRP report. In some aspects, the indication, from the second UE, may set the sidelink transmission beam and the transmission power control parameters.

At 1412, the second UE may transmit a sidelink reference signal and corresponding transmission power. For example, 1412 may be performed by RS component 1544 of apparatus 1502. The second UE may transmit the sidelink reference signal and the corresponding transmission power to the first UE. A sidelink transmission beam and a transmission power may be selected based at least on the sidelink reference signal. In some aspects, the sidelink transmission beam may be based on a sidelink reference signal index and associated sidelink path loss.

At 1414, the second UE may receive a CRI. For example, 1414 may be performed by RS component 1544 of apparatus

1502. The second UE may receive the CRI from the first UE. The transmission of the CRI may allow the second UE to determine the sidelink transmission beam and the power control parameters.

At 1416, the second UE may transmit an indication to set the sidelink transmission beam. For example, 1416 may be performed by beam component 1546 of apparatus 1502. The second UE may transmit the indication to set the sidelink transmission beam to the first UE. The indication to set the sidelink transmission beam may be based on the CRI. In some aspects, the indication may set the sidelink transmission beam and the power control parameters. In some aspects, the indication may be transmitted via MAC-CE or SCI.

At 1418, the second UE may receive at least one PSSCH. For example, 1418 may be performed by PSSCH component 1548 of apparatus 1502. The second UE may receive the at least one PSSCH from the first UE. In some aspects, transmission of the at least one PSSCH may allow the first UE to use PSSCH sweeping to determine the sidelink transmission beam and the transmission power. A beam index may be included for the PSSCH transmission. In some aspects, the beam index may be provided via SCI. In some aspects, the second UE may calculate the RSRP of the at least one PSSCH from the first UE, such that the second UE may provide a subset of PSSCH beam indexes and associated RSRP. The subset of PSSCH beam indexes may correspond to the PSSCHs having the highest RSRP at the second UE.

At 1420, the second UE may transmit an RSRP report comprising a PSCCH beam index and an associated RSRP. For example, 1420 may be performed by PSSCH component 1548 of apparatus 1502. The second UE may transmit the RSRP report to the first UE. The RSRP report comprising the PSCCH beam index and the associated RSRP may be based on the at least one PSSCH. A sidelink transmission beam and a transmission power may be selected based on RSRP report.

At 1422, the second UE may communicate with the first UE. For example, 1422 may be performed by communication component 1550 of apparatus 1502. The second UE may communicate with the first UE via the sidelink beam and the associated power control parameters.

Figure 15:
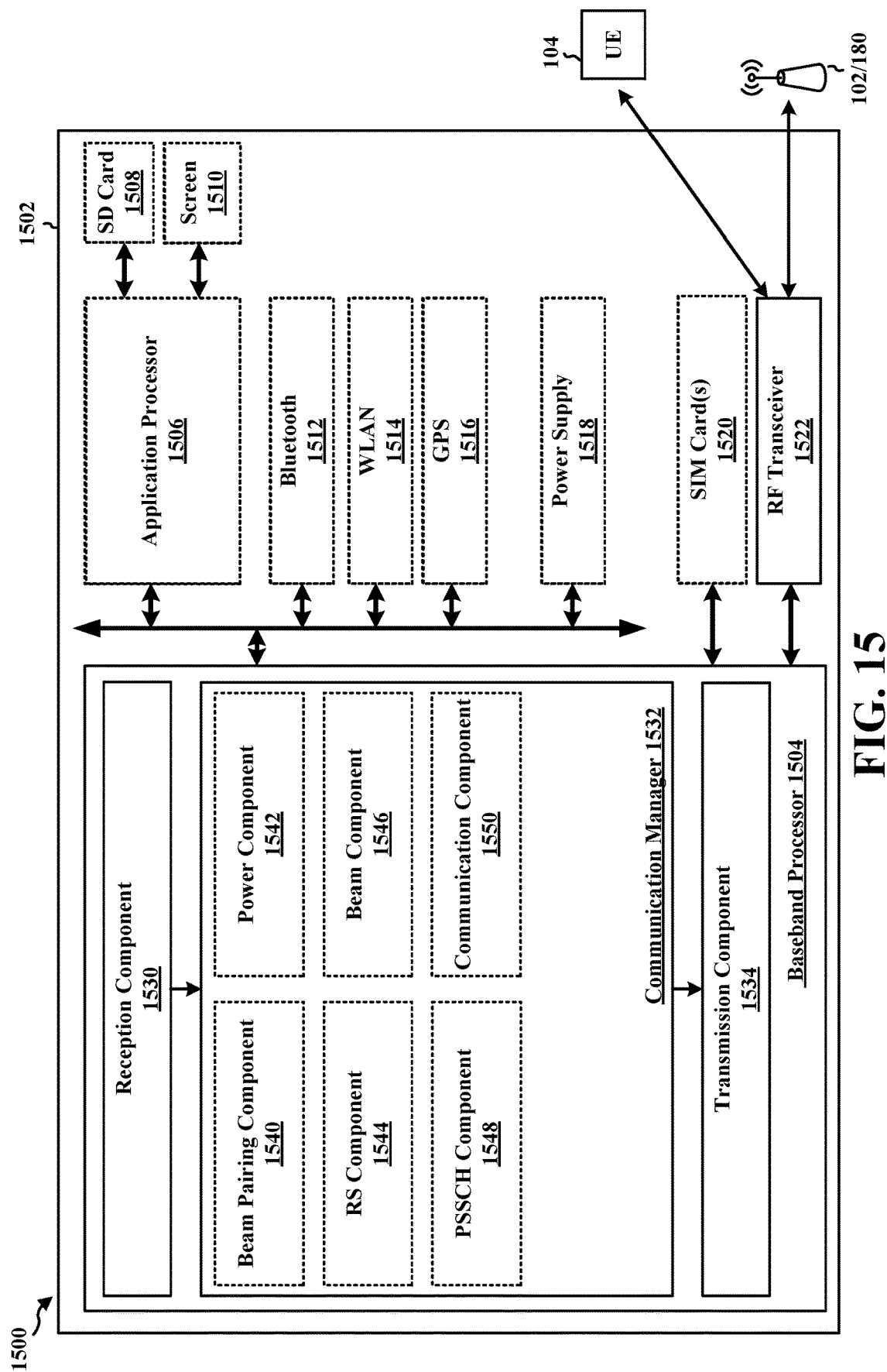
FIG. 15 is a diagram illustrating an example of a hardware implementation for an example apparatus.

FIG. 15 is a diagram 1500 illustrating an example of a hardware implementation for an apparatus 1502. The apparatus 1502 may be a UE, or another device configured to transmit and/or receive sidelink communication. The apparatus 1502 includes a baseband processor 1504 (also referred to as a modem) coupled to a RF transceiver 1522. In some aspects, the baseband processor 1504 may be a cellular baseband processor and/or the RF transceiver 1522 may be a cellular RF transceiver. The apparatus 1502 may further include one or more subscriber identity modules (SIM) cards 1520, an application processor 1506 coupled to a secure digital (SD) card 1508 and a screen 1510, a Bluetooth module 1512, a wireless local area network (WLAN) module 1514, a Global Positioning System (GPS) module 1516, and/or a power supply 1518. The baseband processor 1504 communicates through the RF transceiver 1522 with the UE 104 and/or BS 102/180. The baseband processor 1504 may include a computer-readable medium/memory. The computer-readable medium/memory may be non-transitory. The baseband processor 1504 is responsible for general processing, including the execution of software stored on the computer-readable medium/memory. The software, when executed by the baseband processor 1504, causes the baseband processor 1504 to perform the various functions described in the present application. The computer-readable medium/memory may also be used for storing data that is manipulated by the baseband processor 1504 when executing software. The baseband processor 1504 further includes a reception component 1530, a communication manager 1532, and a transmission component 1534. The communication manager 1532 includes the one or more illustrated components. The components within the communication manager 1532 may be stored in the computer-readable medium/memory and/or configured as hardware within the baseband processor 1504. The baseband processor 1504 may be a component of the device 350 and may include the memory 360 and/or at least one of the TX processor 368, the RX processor 356, and the controller/processor 359. In one configuration, the apparatus 1502 may be a modem chip and include just the baseband processor 1504, and in another configuration, the apparatus 1502 may be the entire UE (e.g., see 350 of FIG. 3) and include the additional modules of the apparatus 1502.

The communication manager 1532 includes a beam pairing component 1540 that is configured to receive a request for initiating a beam pairing with a first UE, e.g., as described in connection with 1302 of FIG. 13 or 1402 of FIG. 14. The communication manager 1532 further includes a power component 1542 that is configured to transmit or receive one or more sidelink reference signals, e.g., as described in connection with 1304 of FIG. 13 or 1404 of FIG. 14. The communication manager 1532 further includes an RS component 1544 that is configured to receive at least one sidelink reference signal, e.g., as described in connection with 1406 of FIG. 14. The RS component 1544 may be further configured to transmit an RSRP report comprising a CRI and an associated RSRP, e.g., as described in connection with 1408 of FIG. 14. The RS component 1544 may be further configured to transmit a sidelink reference signal and corresponding transmission power, e.g., as described in connection with 1412 of FIG. 14. The RS component 1544 may be further configured to receive a CRI, e.g., as described in connection with 1414 of FIG. 14. The communication manager 1532 further includes a beam component 1546 that is configured to transmit an indication to set the sidelink transmission beam, e.g., as described in connection with 1410 of FIG. 14. The beam component 1546 may be further configured to transmit an indication to set the sidelink transmission beam, e.g., as described in connection with 1416 of FIG. 14. The communication manager 1532 further includes a PSSCH component 1548 that is configured to receive at least one PSSCH, e.g., as described in connection with 1418 of FIG. 14. The PSSCH component 1548 may be further configured to transmit an RSRP report comprising a PSCCH beam index and an associated RSRP, e.g., as described in connection with 1420 of FIG. 14. The communication manager 1532 further includes a communication component 1550 that is configured to communicate with the first UE, e.g., as descried in connection with 1306 of FIG. 13 or 1422 of FIG. 14.

The apparatus may include additional components that perform each of the blocks of the algorithm in the flowcharts of FIGS. 13 and 14. As such, each block in the flowcharts of FIGS. 13 and 14 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1502, and in particular the baseband processor 1504, includes means for receiving a request for initiating a beam pairing with a first UE, the first UE being a transmitting UE and the second UE being a receiving UE. The apparatus includes means for transmitting or receiving one or more sidelink reference signals to determine a sidelink beam and associated power control parameters for sidelink communication with the first UE. Different sidelink beams use different power control parameters. The apparatus includes means for communicating with the first UE via the sidelink beam and the associated power control parameters. The apparatus further includes means for receiving, from the first UE, at least one sidelink reference signal. A sidelink transmission beam and a transmission power are selected based on the at least one sidelink reference signal. The apparatus further includes means for transmitting, to the first UE, an RSRP report comprising a CRI and an associated RSRP based on the at least one sidelink reference signal received at the second UE. A sidelink path loss is calculated based on the RSRP report. The apparatus further includes means for transmitting, to the first UE, an indication to set the sidelink transmission beam. The first UE selects transmission power control parameters based at least on the RSRP report. The apparatus further includes means for transmitting, to the first UE, a sidelink reference signal and a corresponding transmission power. A sidelink transmission beam and a transmission power are selected based at least on the sidelink reference signal. The apparatus further includes means for receiving, from the first UE, a CRI. The apparatus further includes means for transmitting, to the first UE, an indication to set the sidelink transmission beam based on the CRI. The apparatus further includes means for receiving, from the first UE, at least one PSSCH. The apparatus further includes means for transmitting, to the first UE, an RSRP report comprising a PSCCH beam index and an associated RSRP based on the at least one PSSCH. A sidelink transmission beam and a transmission power are selected based on RSRP report. The means may be one or more of the components of the apparatus 1502 configured to perform the functions recited by the means. As described herein, the apparatus 1502 may include the TX Processor 368, the RX Processor 356, and the controller/processor 359. As such, in one configuration, the means may be the TX Processor 368, the RX Processor 356, and the controller/processor 359 configured to perform the functions recited by the means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following examples are illustrative only and may be combined with aspects of other embodiments or teachings described herein, without limitation.

Aspect 1 is an apparatus for wireless communication at a first UE including at least one processor coupled to a memory and configured to initiate a beam pairing with a second UE, the first UE being a transmitting UE and the second UE being a receiving UE; identify a sidelink beam from a plurality of sidelink beams and at least one power control parameter for sidelink communication with the second UE, wherein different sidelink beams use different power control parameters; and communicate with the second UE via a selected sidelink beam and the at least one power control parameter.

Aspect 2 is the apparatus of aspect 1, further including a transceiver coupled to the at least one processor.

Aspect 3 is the apparatus of any of aspects 1 and 2, further includes that the at least one power control parameter comprises at least one of a sidelink path loss reference signal, a sidelink path loss for power control, or a sidelink p0 and a sidelink alpha for power control.

Aspect 4 is the apparatus of any of aspects 1-3, further includes that a setting of the sidelink path loss reference signal is associated with a sidelink TCI state.

Aspect 5 is the apparatus of any of aspects 1-4, further includes that a setting of the sidelink p0 or the sidelink alpha are associated with a sidelink TCI state.

Aspect 6 is the apparatus of any of aspects 1-5, further includes that the at least one power control parameter is configured via RRC signaling or MAC-CE.

Aspect 7 is the apparatus of any of aspects 1-6, further includes that the at least one processor is further configured to receive a configuration of the at least one power control parameter for the sidelink communication.

Aspect 8 is the apparatus of any of aspects 1-7, further includes that the at least one processor is further configured to calculate a reference signal power of at least one beam from a plurality of beams based on a sidelink reference signal.

Aspect 9 is the apparatus of any of aspects 1-8, further includes that the plurality of beams are filtered if different beams have different transmission power.

Aspect 10 is the apparatus of any of aspects 1-9, further includes that a set of sidelink beams having similar properties are comprised within a beam group of a plurality of beam groups, wherein a filtering of beams is based on the plurality of beam groups.

Aspect 11 is the apparatus of any of aspects 1-10, further includes that the at least one processor is further configured to transmit, to the second UE, at least one sidelink reference signal, wherein a sidelink transmission beam and a transmission power are selected based on the at least one sidelink reference signal.

Aspect 12 is the apparatus of any of aspects 1-11, further includes that the at least one sidelink reference signal comprises CSI-RS or SSB.

Aspect 13 is the apparatus of any of aspects 1-12, further includes that wherein the at least one processor is further configured to receive, from the second UE, an RSRP report comprising CRI and an associated RSRP based on the at least one sidelink reference signal received at the second UE, wherein a sidelink path loss is calculated based on the RSRP report.

Aspect 14 is the apparatus of any of aspects 1-13, further includes that the sidelink transmission beam and transmission control parameters are based at least on the RSRP report.

Aspect 15 is the apparatus of any of aspects 1-14, further includes that the at least one processor is further configured to receive, from the second UE, an indication to set the sidelink transmission beam, wherein the first UE selects transmission power control parameters based at least on the RSRP report.

Aspect 16 is the apparatus of any of aspects 1-15, further includes that the at least one processor is further configured to receive, from the second UE, an indication to set the sidelink transmission beam and transmission power control parameters.

Aspect 17 is the apparatus of any of aspects 1-16, further includes that the at least one processor is further configured to receive, from the second UE, a sidelink reference signal and a corresponding transmission power, wherein a sidelink transmission beam and a transmission power are selected based at least on the sidelink reference signal.

Aspect 18 is the apparatus of any of aspects 1-17, further includes that the sidelink transmission beam is based on a sidelink reference signal index and associated sidelink path loss.

Aspect 19 is the apparatus of any of aspects 1-18, further includes that the at least one processor is further configured to transmit, to the second UE, a CRI; and receive, from the second UE, an indication to set the sidelink transmission beam based on the CRI.

Aspect 20 is the apparatus of any of aspects 1-19, further includes that the at least one processor is further configured to transmit, to the second UE, at least one PSSCH; and receive, from the second UE, an RSRP report comprising a PSCCH beam index and an associated RSRP based on the at least one PSSCH, wherein a sidelink transmission beam and a transmission power are selected based on RSRP report.

Aspect 21 is a method of wireless communication for implementing any of aspects 1-20.

Aspect 22 is an apparatus for wireless communication including means for implementing any of aspects 1-20.

Aspect 23 is a computer-readable medium storing computer executable code, where the code when executed by a processor causes the processor to implement any of aspects 1-20.

Aspect 24 is an apparatus for wireless communication at a second UE including at least one processor coupled to a memory and configured to receive a request for initiating a beam pairing with a first UE, the first UE being a transmitting UE and the second UE being a receiving UE; transmit or receiving one or more sidelink reference signals to determine a sidelink beam and associated power control parameters for sidelink communication with the first UE, wherein different sidelink beams use different power control parameters; and communicate with the first UE via the sidelink beam and the associated power control parameters.

Aspect 25 is the apparatus of aspects 24, further including a transceiver coupled to the at least one processor.

Aspect 26 is the apparatus of any of aspects 24 and 25, further includes that the at least one processor is further configured to receive, from the first UE, at least one sidelink reference signal, wherein a sidelink transmission beam and a transmission power are selected based on the at least one sidelink reference signal.

Aspect 27 is the apparatus of any of aspects 24-26, further includes that the at least one sidelink reference signal comprises a CSI-RS or an SSB.

Aspect 28 is the apparatus of any of aspects 24-27, further includes that the at least one processor is further configured to transmit, to the first UE, an RSRP report comprising a CRI and an associated RSRP based on the at least one sidelink reference signal received at the second UE, wherein a sidelink path loss is calculated based on the RSRP report.

Aspect 29 is the apparatus of any of aspects 24-28, further includes that the at least one processor is further configured to transmit, to the first UE, an indication to set the sidelink transmission beam, wherein the first UE selects transmission power control parameters based at least on the RSRP report.

Aspect 30 is the apparatus of any of aspects 24-29, further includes that the at least one processor is further configured to transmit, to the first UE, a sidelink reference signal and a corresponding transmission power, wherein a sidelink transmission beam and a transmission power are selected based at least on the sidelink reference signal.

Aspect 31 is the apparatus of any of aspects 24-30, further includes that the at least one processor is further configured to receive, from the first UE, at least one PSSCH; and transmit, to the first UE, a reference signal received power (RSRP) report comprising a PSCCH beam index and an associated RSRP based on the at least one PSSCH, wherein a sidelink transmission beam and a transmission power are selected based on RSRP report.

Aspect 32 is a method of wireless communication for implementing any of aspects 24-31.

Aspect 33 is an apparatus for wireless communication including means for implementing any of aspects 24-31.

Aspect 34 is a computer-readable medium storing computer executable code, where the code when executed by a processor causes the processor to implement any of aspects 24-31.

What is claimed is:

1. An apparatus for wireless communication at a first user equipment (UE), comprising:
   a memory; and
   at least one processor coupled to the memory and configured to:
      initiate a beam pairing with a second UE, the first UE being a transmitting UE and the second UE being a receiving UE;
      identify a sidelink beam from a plurality of sidelink beams and at least one power control parameter for sidelink communication with the second UE, wherein different sidelink beams use different power control parameters;
      receive, from the second UE, a reference signal received power (RSRP) report comprising a CSI-RS resource indicator (CRI) and an associated RSRP, wherein a sidelink path loss is calculated based on the RSRP report; and
      communicate with the second UE via a selected sidelink beam and the at least one power control parameter.

2. The apparatus of claim 1, further comprising a transceiver coupled to the at least one processor.

3. The apparatus of claim 1, wherein the at least one power control parameter comprises at least one of a sidelink path loss reference signal, the sidelink path loss for power control, or a sidelink p0 and a sidelink alpha for the power control.

4. The apparatus of claim 3, wherein a setting of the sidelink path loss reference signal is associated with a sidelink transmission configuration indicator (TCI) state.

5. The apparatus of claim 3, wherein a setting of the sidelink p0 or the sidelink alpha are associated with a sidelink transmission configuration indicator (TCI) state.

6. The apparatus of claim 1, wherein the at least one power control parameter is configured via radio resource control (RRC) signaling or medium access control (MAC) control element (CE) (MAC-CE).

7. The apparatus of claim 1, wherein the at least one processor is further configured to:
   receive a configuration of the at least one power control parameter for the sidelink communication.

8. The apparatus of claim 1, wherein the at least one processor is further configured to:
   calculate a reference signal power of at least one beam from a plurality of beams based on a sidelink reference signal.

9. The apparatus of claim 8, wherein the plurality of beams are filtered if different beams have different transmission power.

10. The apparatus of claim 8, wherein a set of sidelink beams having similar properties are comprised within a beam group of a plurality of beam groups, wherein a filtering of beams is based on the plurality of beam groups.

11. The apparatus of claim 1, wherein the at least one processor is further configured to:
    transmit, to the second UE, at least one sidelink reference signal, wherein a sidelink transmission beam and a transmission power are selected based on the at least one sidelink reference signal.

12. The apparatus of claim 11, wherein the at least one sidelink reference signal comprises a channel state information reference signal (CSI-RS) or a synchronization signal block (SSB).

13. The apparatus of claim 11, wherein the RSRP report comprising the CRI and the associated RSRP is based on the at least one sidelink reference signal received at the second UE.

14. The apparatus of claim 13, wherein the sidelink transmission beam and transmission control parameters are based at least on the RSRP report.

15. The apparatus of claim 13, wherein the at least one processor is further configured to:
    receive, from the second UE, an indication to set the sidelink transmission beam, wherein the first UE selects transmission power control parameters based at least on the RSRP report.

16. The apparatus of claim 13, wherein the at least one processor is further configured to:
    receive, from the second UE, an indication to set the sidelink transmission beam and transmission power control parameters.

17. The apparatus of claim 1, wherein the at least one processor is further configured to:
    receive, from the second UE, a sidelink reference signal and a corresponding transmission power, wherein a sidelink transmission beam and a transmission power are selected based at least on the sidelink reference signal.

18. The apparatus of claim 17, wherein the sidelink transmission beam is based on a sidelink reference signal index and associated sidelink path loss.

19. The apparatus of claim 17, wherein the at least one processor is further configured to:
    transmit, to the second UE, the CRI; and
    receive, from the second UE, an indication to set the sidelink transmission beam based on the CRI.

20. The apparatus of claim 1, wherein the at least one processor is further configured to:
    transmit, to the second UE, at least one physical sidelink shared channel (PSSCH); and
    receive, from the second UE, the RSRP report comprising a PSCCH beam index and the associated RSRP based on the at least one PSSCH, wherein a sidelink transmission beam and a transmission power are selected based on RSRP report.

21. A method of wireless communication at a first user equipment (UE), comprising:
    initiating a beam pairing with a second UE, the first UE being a transmitting UE and the second UE being a receiving UE;
    identifying a sidelink beam from a plurality of sidelink beams and at least one power control parameter for sidelink communication with the second UE, wherein different sidelink beams use different power control parameters;
    receiving, from the second UE, a reference signal received power (RSRP) report comprising a CSI-RS resource indicator (CRI) and an associated RSRP, wherein a sidelink path loss is calculated based on the RSRP report; and
    communicating with the second UE via a selected sidelink beam and the at least one power control parameter.

22. An apparatus for wireless communication at a second user equipment (UE), comprising:
    a memory; and
    at least one processor coupled to the memory and configured to:
       receive a request for initiating a beam pairing with a first UE, the first UE being a transmitting UE and the second UE being a receiving UE;

transmit or receiving one or more sidelink reference signals to determine a sidelink beam and associated power control parameters for sidelink communication with the first UE, wherein different sidelink beams use different power control parameters;

transmit, to the first UE, a reference signal received power (RSRP) report comprising a CSI-RS resource indicator (CRI) and an associated RSRP, wherein a sidelink path loss is calculated based on the RSRP report; and communicate with the first UE via the sidelink beam and the associated power control parameters.

23. The apparatus of claim 22, further comprising a transceiver coupled to the at least one processor.

24. The apparatus of claim 22, wherein the at least one processor is further configured to:

receive, from the first UE, at least one sidelink reference signal, wherein a sidelink transmission beam and a transmission power are selected based on the at least one sidelink reference signal.

25. The apparatus of claim 24, wherein the at least one sidelink reference signal comprises a channel state information reference signal (CSI-RS) or a synchronization signal block (SSB).

26. The apparatus of claim 24, wherein the RSRP report comprising the CRI and the associated RSRP is based on the at least one sidelink reference signal received at the second UE.

27. The apparatus of claim 26, wherein the at least one processor is further configured to:

transmit, to the first UE, an indication to set the sidelink transmission beam, wherein the first UE selects transmission power control parameters based at least on the RSRP report.

28. The apparatus of claim 22, wherein the at least one processor is further configured to:

transmit, to the first UE, a sidelink reference signal and a corresponding transmission power, wherein a sidelink transmission beam and a transmission power are selected based at least on the sidelink reference signal.

29. The apparatus of claim 22, wherein the at least one processor is further configured to:

receive, from the first UE, at least one physical sidelink shared channel (PSSCH); and transmit, to the first UE, the RSRP report comprising a physical sidelink control channel (PSCCH) beam index and the associated RSRP based on the at least one PSSCH, wherein a sidelink transmission beam and a transmission power are selected based on RSRP report.

30. A method of wireless communication at a second user equipment (UE), comprising:

receiving a request for initiating a beam pairing with a first UE, the first UE being a transmitting UE and the second UE being a receiving UE;

transmitting or receiving one or more sidelink reference signals to determine a sidelink beam and associated power control parameters for sidelink communication with the first UE, wherein different sidelink beams use different power control parameters;

transmitting, to the first UE, a reference signal received power (RSRP) report comprising a CSI-RS resource indicator (CRI) and an associated RSRP, wherein a sidelink path loss is calculated based on the RSRP report; and communicating with the first UE via the sidelink beam and the associated power control parameters.

* * * * *